US012658394B2

(12) United States Patent
Kojima et al.

(10) Patent No.: US 12,658,394 B2
(45) Date of Patent: Jun. 16, 2026

(54) SAFETY SWITCH WITH AN ELECTROMAGNETIC LOCK MECHANISM

(71) Applicant: Keyence Corporation, Osaka (JP)

(72) Inventors: Kenji Kojima, Osaka (JP); Satoru Tomoshi, Osaka (JP); Hiroshi Kashima, Osaka (JP); Choryon Oh, Osaka (JP); Manabu Tsuboyama, Osaka (JP)

(73) Assignee: KEYENCE CORPORATION, Osaka (JP)

(*) Notice: Subject to any disclaimer, the term of this patent is extended or adjusted under 35 U.S.C. 154(b) by 385 days.

(21) Appl. No.: 18/229,185

(22) Filed: Aug. 2, 2023

(65) Prior Publication Data

US 2024/0055208 A1 Feb. 15, 2024

(30) Foreign Application Priority Data

Aug. 10, 2022 (JP) ................................ 2022-127824
Aug. 10, 2022 (JP) ................................ 2022-127826

(51) Int. Cl.

*H01H 50/44* (2006.01)
*H01H 47/22* (2006.01)
*H01H 50/02* (2006.01)
*H01H 50/08* (2006.01)
*H01H 50/36* (2006.01)

(52) U.S. Cl.

CPC ............ *H01H 50/44* (2013.01); *H01H 47/22* (2013.01); *H01H 50/02* (2013.01); *H01H 50/08* (2013.01); *H01H 50/36* (2013.01)

(58) Field of Classification Search

None
See application file for complete search history.

(56) References Cited

U.S. PATENT DOCUMENTS

| | | | |
|---|---|---|---|
| 6,053,546 | A | 4/2000 | Frolov |
| 10,948,892 | B2 | 3/2021 | Babasaki et al. |
| 11,008,798 | B2 | 5/2021 | Kashima et al. |
| 11,551,884 | B2 | 1/2023 | Oh et al. |

(Continued)

FOREIGN PATENT DOCUMENTS

| | | | |
|---|---|---|---|
| EP | 1862624 | A2 | 12/2007 |
| EP | 3809035 | A1 | 4/2021 |

(Continued)

OTHER PUBLICATIONS

Office Action issued in corresponding Japanese Patent Application 2022-127826 dated Aug. 5, 2025 (10 pages).

(Continued)

*Primary Examiner* — Bernard Rojas
(74) *Attorney, Agent, or Firm* — Kilyk & Bowersox, P.L.L.C.

(57) ABSTRACT

A worker is prevented from being hindered. A safety switch includes a switch body including an electromagnet and an actuator attracted to the electromagnet. The switch body includes a drive control unit and a safety control unit which control the safety switch, and the drive control unit and the safety control unit are surrounded by a housing. The housing is arranged on a back surface side of the electromagnet of the switch body, and the housing forms an accommodating portion that accommodates the drive control unit and the safety control unit.

17 Claims, 27 Drawing Sheets

(56) References Cited

U.S. PATENT DOCUMENTS

| | | | | |
|---|---|---|---|---|
| 2004/0222645 | A1 * | 11/2004 | Pirone | G07C 9/00571 292/251.5 |
| 2005/0160777 | A1 | 7/2005 | Baechle et al. | |
| 2007/0279160 | A1 | 12/2007 | Schmid | |
| 2008/0094158 | A1 | 4/2008 | Schmid | |
| 2015/0275551 | A1 * | 10/2015 | Rink | H01H 27/007 70/263 |
| 2021/0108760 | A1 | 4/2021 | Phay | |

FOREIGN PATENT DOCUMENTS

| | | | |
|---|---|---|---|
| JP | 2005528738 | A | 9/2005 |
| JP | 2008106600 | A | 5/2008 |
| JP | 2016510382 | A | 4/2016 |
| JP | 2019183541 | A | 10/2019 |

OTHER PUBLICATIONS

Reason for Submission issued in corresponding Japanese Patent Application 2022-127826 dated Aug. 13, 2025 (10 pages).
U.S. Appl. No. 18/229,183, filed Aug. 2, 2023 (82 pages).
U.S. Appl. No. 18/229,184, filed Aug. 2, 2023 (54 pages).
U.S. Appl. No. 18/229,187, filed Aug. 2, 2023 (79 pages).

* cited by examiner

FIG. 22

| INDICATOR LAMP | STATE | | | |
|---|---|---|---|---|
| | OSSD | SAFETY INPUT | LOCK CONTROL INPUT | ACTUATOR |
| GREEN | ON | ON | ON | Detected |
| RED | OFF | ON OR OFF | ON OR OFF | Not detected |
| BLINKING IN GREEN | OFF | ON | OFF | Detected |
| ORANGE | OFF | OFF | ON | Detected |
| BLINKING IN ORANGE | OFF | OFF | OFF | Detected |
| OFF | OFF | POWER OFF | | |

(BLINKING IN RED WHEN ERROR OCCURS)

SAFETY SWITCH WITH AN ELECTROMAGNETIC LOCK MECHANISM

CROSS-REFERENCE TO RELATED APPLICATIONS

The present application claims foreign priority based on Japanese Patent Application No. 2022-127824, filed Aug. 10, 2022, and No. 2022-127826, filed Aug. 10, 2022, the contents of which are incorporated herein by references.

BACKGROUND OF THE INVENTION

1. Field of the Invention

The invention relates to a safety switch.

2. Description of Related Art

In an environment in which an apparatus operates, there is a possibility that a human body is damaged by the apparatus in a state in which the human body can freely come into contact with the operating apparatus. In the environment in which the apparatus operates, an operation region in which the apparatus operates is comparted by a protective fence or a compartment panel in order to prevent the human body from being damaged by the operating apparatus, in other words, in order to realize a safe state. One method for realizing the safe state by comparting the operation region is a method in which an operation region is comparted by, a fixed portion such as a protective fence, to prevent a human body from entering the operation region, that is, the operation region is isolated from a region where the human body is present. Another method is a method of constructing a compartment system capable of comparting an operation region and limiting operation of an apparatus. In the compartment system, a compartment in which an operation region is comparted by a fixed portion, such as a protective fence, and then, an opening in a part of the compartment and a movable portion that opens and closes the opening are installed, that is, a compartment allowing a worker to enter the operation region is formed. In the compartment system, a control system is constructed so as to monitor the movable portion and control the apparatus operating in the operation region not to damage the human body in accordance with the monitoring result. In such a compartment system, a safety switch that monitors opening and closing of the movable portion is installed in a region of the opening where the movable portion is installed.

The safety switch includes a switch body arranged at the compartment fixed portion, and an actuator arranged on an openable and closable door constituting the compartment movable portion. The safety switch detects and outputs opening of the door, which is the movable portion, as a function for maintaining the operation region in a safe state, and the apparatus in the operation region is controlled to a state in which the human body is not damaged in response to the output from the safety switch in the entire compartment system. A safety measure for an environment in which the apparatus operates is taken by adopting a system configuration, for example, by stopping the apparatus in the operation region, reducing the operation speed of the apparatus, or the like in response to the output from the safety switch.

As one type of safety switch, a safety switch with a lock pin mechanism is disclosed in JP 2019-183541 A. The safety switch with a lock pin mechanism includes an actuator bolt installed in a compartment fixed portion and a switch body installed in a door, and the switch body is provided with a lock pin. The actuator bolt and the switch body are arranged at relative positions facing each other when the door is closed. In the lock pin mechanism, a locked state in which the actuator bolt and the lock pin are physically integrated is formed by mechanically engaging the lock pin with the actuator bolt. The safety switch with a lock pin mechanism is provided with a detection mechanism so as to be capable of detecting that the locked state of the safety switch with a lock pin mechanism, and performs output to indicate a state not being the locked state at least when the locked state is not formed. When the door is closed, and then the lock pin mechanism is brought into the locked state, the openable and closable door in the closed state is fixed in a state of being integrated with the compartment fixed portion. Conversely, an unlocked state is formed when the lock pin is removed from the actuator bolt, and the door can be opened.

JP 2016-510382 A discloses a safety switch with an electromagnetic lock mechanism, which is another type of safety switch. That is, the safety switch with an electromagnetic lock mechanism includes an electromagnet and an actuator magnetized member that is attracted to the electromagnet. The actuator magnetized member is installed in a door constituting a movable portion, and a switch body including an electromagnet is installed in a compartment fixed portion such as a protective fence. The electromagnet is driven such that the actuator magnetized member is attracted to the electromagnet, thereby forming a door-locked state. The safety switch includes a display unit. The display unit displays a safe state of an operation region.

The safety switch with an electromagnetic lock mechanism disclosed in JP 2016-510382 A includes a locking lever which is operated by a worker in order to prevent the worker from erroneously recognizing that the inside of the operation region is safe, that is, there is no person in the operation region based on a signal "door is closed" and from restarting a machine. This locking lever allows the worker to operate the locking lever after confirming that the operation region is kept safe by some methods. Thus, from such a time point, it can be determined to be safe while the signal "door is closed" is output. Once the door is opened, even if the signal "door is closed" is output thereafter, whether or not it is safe is unclear.

JP 2016-510382 A also discloses a module including a monitoring sensor and a monitoring actuator for monitoring opening and closing of the door. The monitoring actuator is installed in the openable and closable door, and the monitoring sensor is installed in the compartment fixed portion. When the monitoring actuator moves away from or approaches the monitoring sensor in accordance with opening and closing of the door, which is the movable portion, the monitoring sensor generates a door signal including a first state signal indicating "the door has been opened" or a second state signal indicating "the door has been closed".

The switch body disclosed in JP 2016-510382 A has an overall shape that is long in a first axial direction orthogonal to a normal of an attracting surface. Then, the display unit is arranged at a position separated from the attracting surface in the first axial direction. When description is given by referring to a surface on which the attracting surface exists as a "front surface", referring to an opposite surface thereof as a "rear surface", and referring to two surfaces continuous to each side edge of the front surface and each side edge of the rear surface as "side surfaces", the attracting surface is arranged on the front surface in the overall shape of the switch body.

The display unit is arranged on the two side surfaces at a position away from the attracting surface in the first axial direction.

As described above, in the safety measure using the safety switch, the safety switch is installed near an opening through which a human body enters and exits mainly for the purpose of work or the like. Thus, the safety switch becomes a hinderance to the worker. For example, in a case where the safety switch is arranged in the compartment fixed portion outside the operation region, there is an advantage that it is easy for the worker outside the operation region to confirm the display unit of the safety switch. However, the safety switch protrudes outward from the compartment fixed portion regardless of a position of the openable and closable door, which becomes the hinderance to the worker. On the other hand, in a case where the safety switch is arranged inside the operation region, a deterioration in workability due to the safety switch protruding outward from the compartment fixed portion is eliminated, but workability when the openable and closable door is opened is deteriorated. In more detail, in the case where the safety switch is arranged inside the operation region, the switch body needs to be arranged near the actuator arranged on the openable and closable door when the door as the movable portion of the compartment is closed. Thus, the switch body is arranged at a position that is to occupy a region functioning as a door opening when the door is opened. Thus, the safety switch including the switch body becomes a factor of narrowing the region of the door opening where the movable portion is arranged, and thus, there is a possibility that the safety switch becomes a hinderance when the movable portion is opened, that is, when work through the door opening is performed. Further, in the case where the safety switch is arranged inside the operation region, since the safety switch is located in a region of the opening, there is a possibility that the switch body is hardly visible to the worker, for example, when a region of the openable and closable door corresponding to the opening is made of a transparent or translucent member and the worker views the operation region from the outside.

SUMMARY OF THE INVENTION

An object of the invention is to provide a safety switch with an electromagnetic lock mechanism that can be prevented from hindering a worker.

According to the invention, the above technical problem is solved by providing a safety switch in which an actuator is installed to be relatively movable with respect to a switch body, the actuator having a member to be magnetized on which a surface to be attracted is formed, the safety switch including: a detection unit that detects that the actuator is within a predetermined range with respect to the switch body; an electromagnet in which an attracting surface corresponding to the surface to be attracted of the actuator is formed on a front surface side; a lock input unit that receives a lock signal for locking the relative movement of the actuator; a drive control unit that drives the electromagnet in such a manner that the attracting surface and the surface to be attracted are attracted to each other based on the lock signal received by the lock input unit; a safety control unit that generates a safety signal based on the detection of the detection unit; and a housing forming an accommodating portion, which accommodates the drive control unit and the safety control unit, on a back surface side of the electromagnet.

According to the invention, a board accommodating portion is located on a side opposite to the attracting surface with respect to the electromagnet, and thus, it is possible to reduce the presence of the switch body which becomes a factor of narrowing a region of ab opening where a compartment movable portion is installed. Further, the switch body looks small when viewed from the outer side of a compartment, that is, from the outside. That is, since the board accommodating portion of the switch body located inside an operation region is located at a position away from the attracting surface when the attracting surface is viewed from the outside, the switch body looks small when a worker views the operation region from the outside.

Operational effects and other objects of the invention will be apparent from the following detailed description of preferred aspects for carrying out the invention.

BRIEF DESCRIPTION OF THE DRAWINGS

FIG. 22 is a view for specifically describing a display mode of display;

FIGS. 27A-C are views related to a compression coil spring included in the actuator illustrated in FIG. 26, in which FIG. 26A is a plan view, FIG. 26B is a side view of the compression coil spring in an unloaded state, and FIG. 26C is a side view of the compression coil spring in a state of being compressed by applying a compression force;

FIGS. 28A-C are views for describing a process of aligning an orientation of an attracting surface and an orientation of a surface to be attracted in the safety switch of the embodiment, in which FIG. 28A illustrates a standby state of the actuator when the door is opened, FIG. 28B illustrates a state in which the surface to be attracted moves forward toward the attracting surface under an attractive force of a permanent magnet when the actuator approaches the electromagnet in a process of closing the door, and FIG. 28C indicates a state in which the surface to be attracted is in close contact with the attracting surface under the attractive force of the permanent magnet;

FIGS. 29A-C are views for describing a state change of the actuator illustrated in FIGS. 27A-C, in which FIG. 29A is a view in which the surface to be attracted, that is, the iron piece is located at a retracted position, FIG. 29B is a view in which the iron piece is located at an advanced position, and FIG. 29C is a view in which the iron piece is located at the advanced position and is in an inclined state to establish a state parallel to the attracting surface of the electromagnet;

DETAILED DESCRIPTION OF PREFERRED EMBODIMENTS

Embodiments

Figure 1:
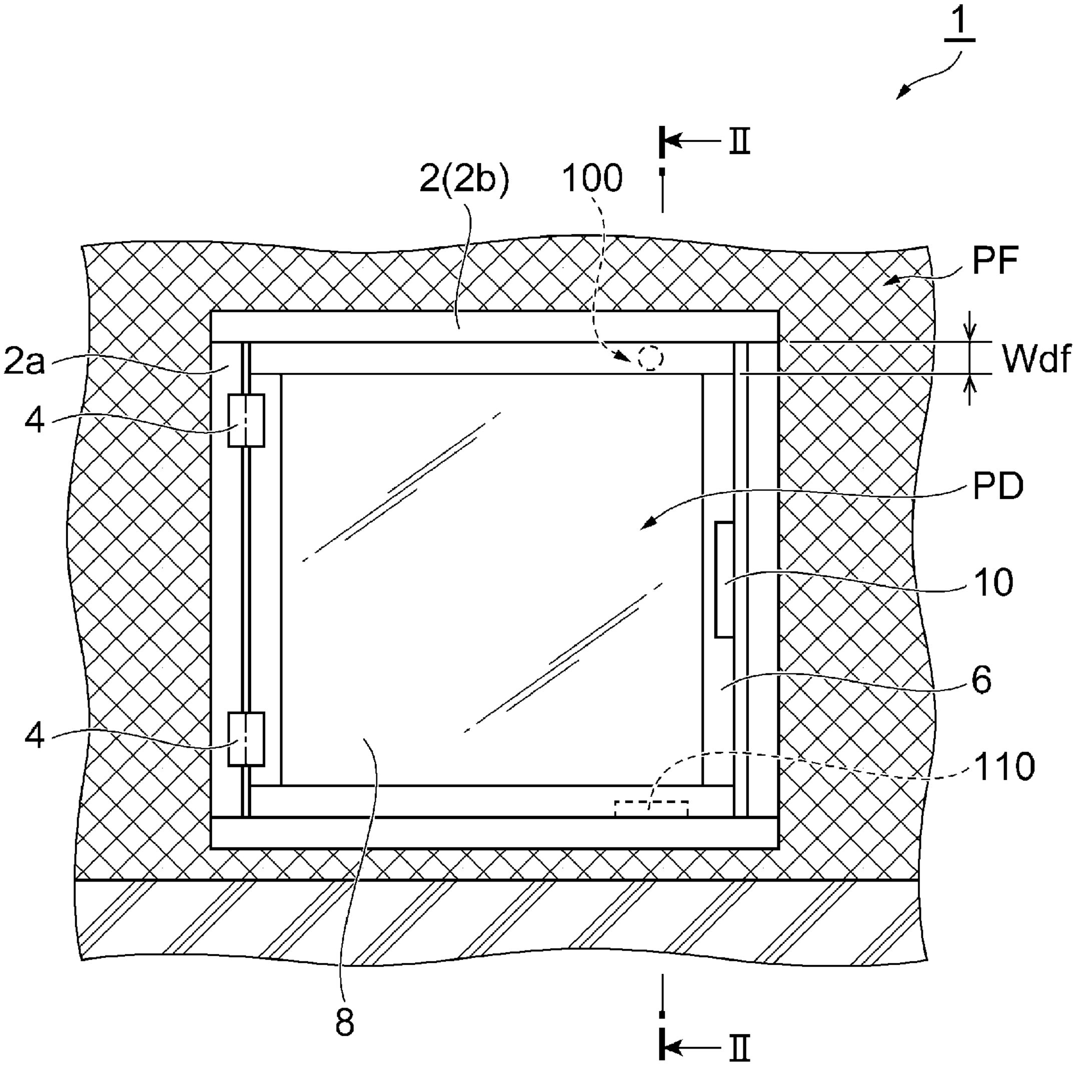
FIG. 1 is a front view of a protective fence and an openable and closable door where a safety switch of an embodiment is installed, the safety switch being configured using a safety switch with an electromagnetic lock mechanism.
Figure 2:
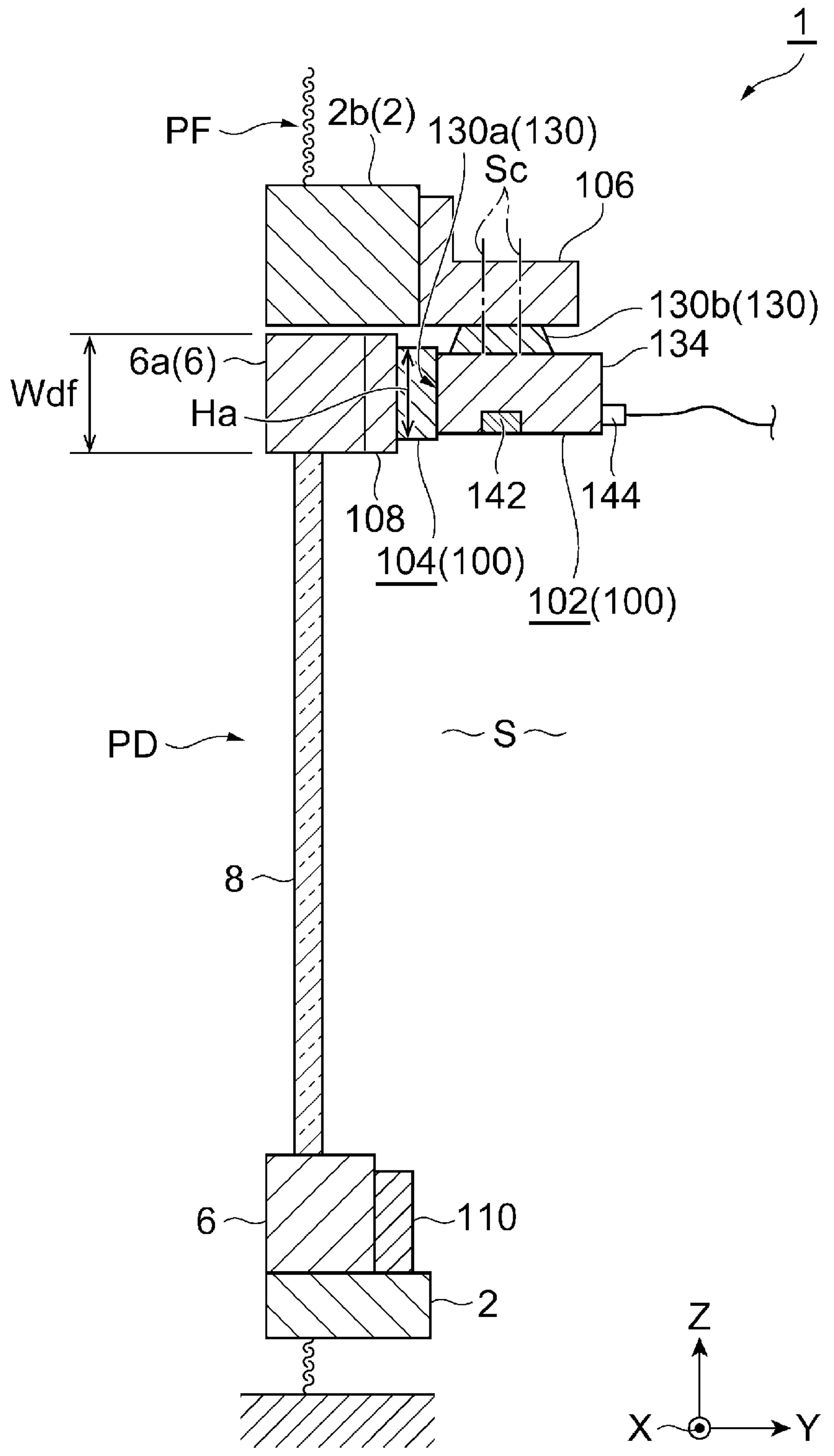
FIG. 2 is a cross-sectional view taken along line II-II in FIG. 1.

Hereinafter, preferred embodiments of the invention will be described with reference to the accompanying drawings. FIG. 1 is an explanatory view of an openable and closable door and a protective fence in which a safety switch with an electromagnetic lock mechanism of an embodiment is installed as a compartment system 1. FIG. 2 is a cross-sectional view taken along line II-II in FIG. 1. In the drawings, reference sign PF denotes the protective fence, and reference sign PD denotes the openable and closable door. FIG. 1 is an explanatory view when the compartment system 1 is seen from outside an operation region S comparted by the compartment system 1. The compartment system 1 includes: the protective fence PF as a compartment fixed portion; the door PD constituting a movable portion movable relative to the compartment fixed portion; and a safety switch 100. The compartment system 1 maintains the operation region S in a safe state by limiting operation of an apparatus inside the operation region S based on a safety-related output that is output from the safety switch 100. In the present embodiment, the safety switch 100 is arranged in the operation region S. The protective fence PF constitutes the compartment fixed portion of the compartment system 1 that comp arts the operation region S in which the apparatus operates. An opening at which the door PD constituting the movable portion is installed with respect to the compartment fixed portion is formed by a door opening frame 2. Referring to FIG. 1, a plurality of hinges 4 separated up and down are provided on one side of the door PD constituting the movable portion, and the door PD is attached to a vertical frame portion 2*a* of the door opening frame 2 via the plurality of hinges 4. That is, the door PD is a single-swing door.

Referring to FIGS. 1 and 2, the door PD includes a door frame 6 and a transparent board 8 surrounded by the door frame 6. The door PD has the above-described hinges 4 attached to one side thereof and a door operating portion 10 attached to the other side thereof (FIG. 1). When the door operating portion 10 is operated, a door latch (not illustrated) disengaged from the door opening frame 2 is opened, and the door PD can be opened.

FIG. 2 illustrates a state in which the door PD is closed, and the door frame 6 constituting the door PD is in contact with a door stopper 110 and is positioned. In FIG. 2, the operation region S comparted by the protective fence PF and the openable and closable door PD is a region located on the right side of the protective fence PF and the door PD on the paper surface of FIG. 2. The safety switch 100 is arranged on the operation region S side in relation to the door PD in the closed state. The safety switch 100 is arranged so as to be located on the operation region S side with respect to the door PD in the closed state of the door PD, whereby the safety switch 100 is arranged inside the operation region S. Referring to FIG. 2, the safety switch 100 includes a switch body 102 and an actuator 104. The switch body 102 is fixed to a surface of an upper horizontal frame portion 2*b* of the door opening frame 2 on the operation region S side via a first bracket 106. The switch body 102 includes an electromagnet 130 having an attracting surface 130*a*. In the closed state of the door PD, the switch body 102 is installed in the door opening frame such that the attracting surface 130*a* faces the door PD, in other words, faces the outside of the operation region S. Note that arrows X, Y, and Z indicating three directions orthogonal to each other are illustrated in FIG. 2, but are associated with arrangement attitudes of the safety switch 100 as will be described later.

As will be described later with reference to FIG. 8 and the like, the switch body 102 of the safety switch 100 of the embodiment includes the electromagnet 130 (FIG. 9) and a board accommodating portion 132, and boards Cb(1), Cb(2) (FIG. 9, FIG. 10) are accommodated in the board accommodating portion 132.

On the other hand, the actuator 104 is arranged on a surface of the door frame 6 on the operation region S side, and specifically, is fixed to an upper side frame portion 6*a* of the door frame 6 via a second bracket 108 (FIG. 2). The door opening frame 2 and the door frame 6 both have a closed rectangular cross section which is a known structure, but may have a U-shaped cross section or an L-shaped cross section as a modification.

Figure 3:
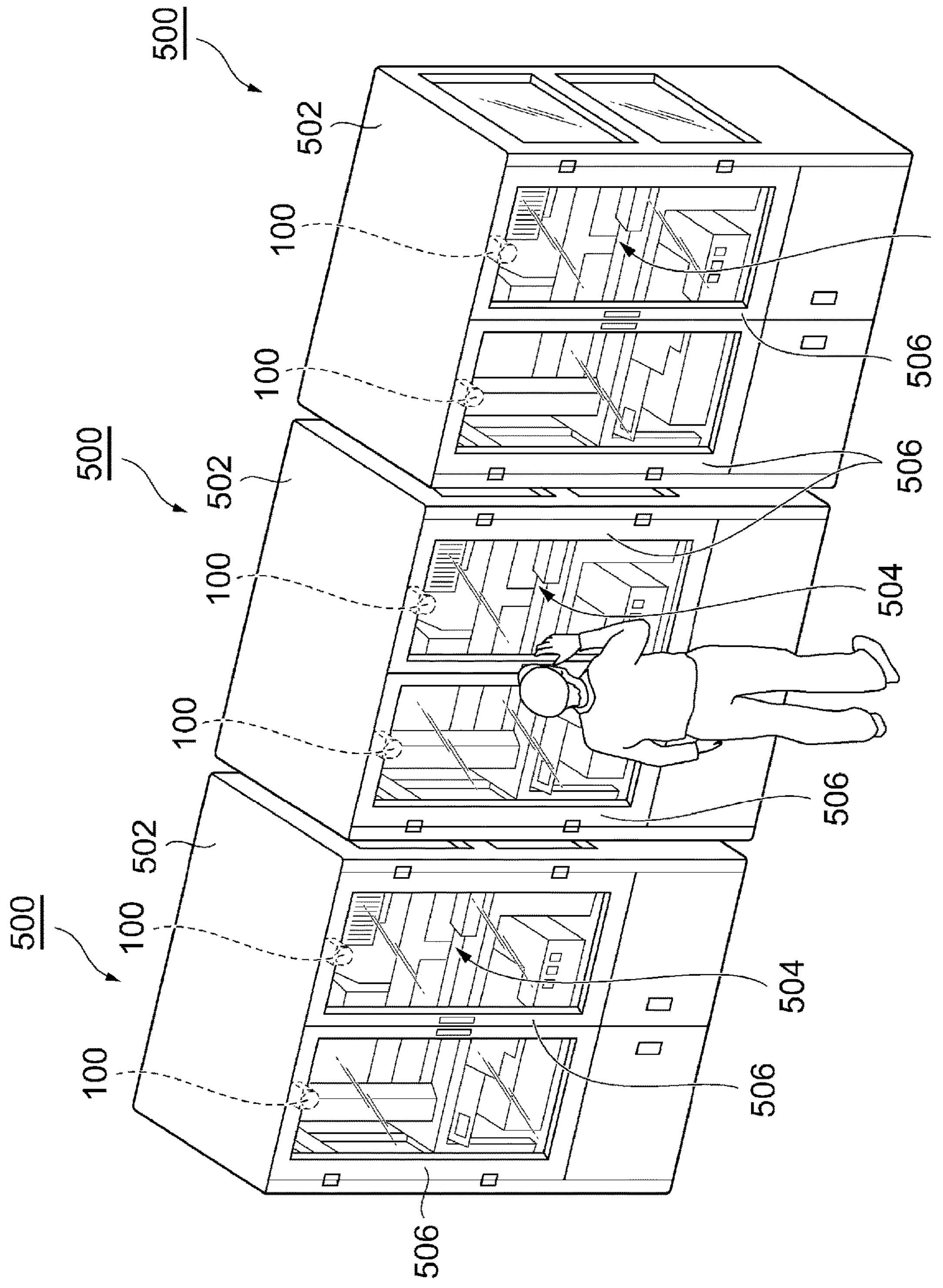
FIG. 3 is a view for describing a box-shaped apparatus to which the invention can be applicable.

The door PD is related to an openable and closable door described in JP 2016-510382 W. On the other hand, FIG. 3 illustrates box-shaped apparatuses 500 each accommodating a work system. In FIG. 3, three apparatuses 500 are arranged side by side. A double-hinged openable and closable door 506 as an example of the door PD is attached to a box 502 of each of the apparatuses 500 such that a worker can manually access an apparatus 504 installed therein. Regarding the openable and closable door 506, the safety switch 100 can be installed in the box-shaped apparatus 500.

Figure 4:
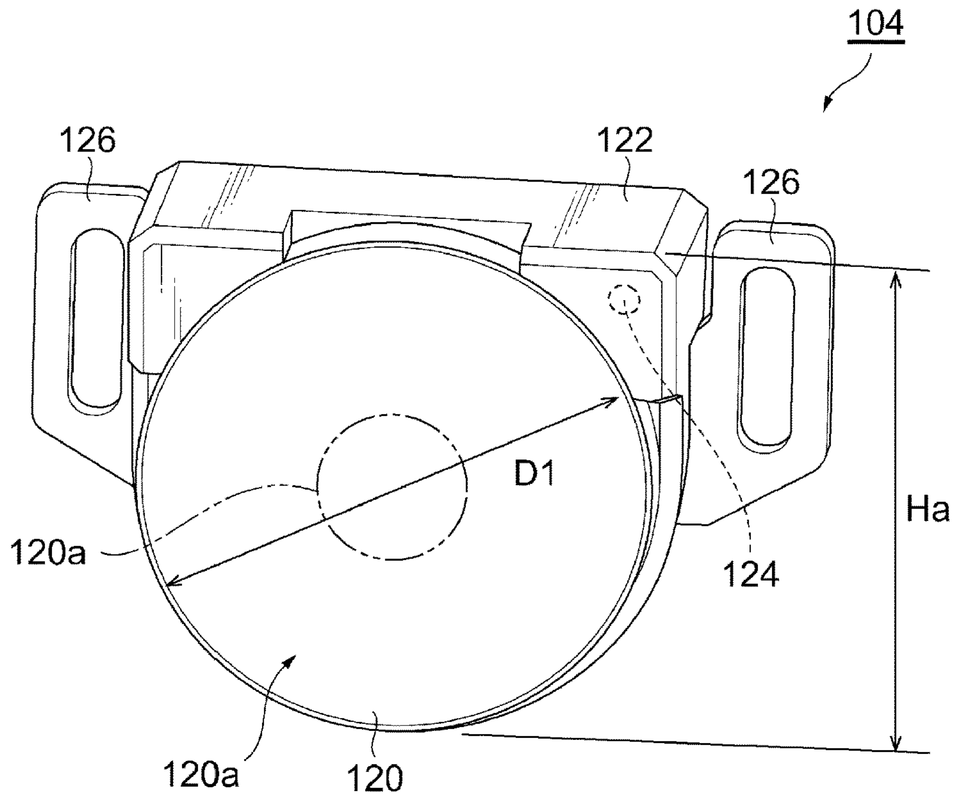
FIG. 4 is a perspective view of an actuator which is one component of the safety switch of the embodiment.

Hereinafter, as a typical example, an embodiment of the invention will be described based on the embodiment applied to the door PD disclosed in FIGS. 1 and 2. FIG. 4 is a substantial front view of the actuator 104 included in the safety switch 100, and is a view for describing a front shape of the actuator 104. The actuator 104 includes an iron piece 120, which is a member to be magnetized, as the main part, and includes a plastic molding 122, an actuator communication unit 124, and an attachment fitting 126. The iron piece 120 has a circular shape in a front view, and has a surface to be attracted 120*a*, which is attracted to the attracting surface 130*a*, on a front surface. A diameter of the iron piece 120 is indicated by reference sign D1. The iron piece 120 is attached to the plastic molding 122. The periphery of the iron piece 120 is covered with the plastic molded article 122, and the actuator communication unit 124 is arranged in a mode of being covered with the plastic molded article 122. The attachment fitting 126 is provided on a side opposite to the iron piece 120 with respect to the plastic molding 122, and has a shape extending to the left and right on the paper surface of FIG. 4. In the attachment fitting 126, a pair of attachment holes through which screws for fastening the attachment fitting are inserted is provided in a portion viewed from the front of the actuator 104. A pair of the attachment fittings 126 is fastened to the second bracket 108, and the actuator 104 is fixed to the door PD via the second bracket 108 (FIG. 2). In the closed state of the door PD, the actuator 104 and the switch body 102 have a relative positional relationship in which the actuator 104 is located on the surface of the door frame 6 on the operation region S side. That is, the actuator 104 is installed on the door frame 6 such that the surface to be attracted 120*a* of the iron piece 120 is oriented to the operation region S in the closed state of the door PD. On the other hand, the switch body 102 is located inside the operation region S. Note that the actuator 104 is fixed to the door PD via the second bracket 108 in the present embodiment, but it may be configured such that the attachment fitting 126 is directly fastened to the door frame 6 to fix the actuator 104 to the door PD.

An arrangement example when the actuator 104 is fixed to the door PD will be specifically described based on an arrangement example illustrated in FIG. 2. As described above, the actuator 104 is fixed to the upper side frame portion 6*a* of the door frame 6. In the present embodiment, the attachment fittings 126 are fixed such that the attachment holes of the pair of attachment fittings 126 of the actuator 104 are arranged side by side in the lateral direction, that is, in the longitudinal direction of the upper side frame portion 6*a*. In this installation example, reference sign Ha in FIG. 4 indicates q height of the iron piece 120 included in the actuator 104 and having a circular shape in the front view. In the installation example of FIG. 2, the actuator 104 is fixed to the door frame 6 in a state in which a direction of the height Ha is aligned with a direction of a width Wdf of the upper side frame 6*a*. The height Ha of the actuator 104 is equal to or smaller than the average width Wdf of the door frame 6 having a rectangular cross section (FIG. 2). Apart of the actuator 104 installed on the door frame 6 may protrude to the inner side of the door frame 6, that is, to a site of the transparent board 8, but a protruding amount thereof is desirably as small as possible. As a result, it is possible to reduce the presence of the actuator 104 from hindering work.

In the safety switch 100 of the present embodiment, the electromagnet 130 of the switch body 102 and the iron piece 120 of the actuator 104 function as an electromagnetic lock mechanism. Then, the electromagnetic lock mechanism of the safety switch has been historically developed following a technical idea of a lock pin mechanism as described above. A design concept of a safety switch 100 with the electromagnetic lock mechanism of the embodiment will be described. In general, when a role of the safety switch is examined, an original request to maintain an operation region in a safe environment in the operation region in which an operating apparatus is arranged is realized by a function of detecting opening and closing of a door, and a role required for a door lock function is to allow the apparatus to continuously operate in the operation region. Therefore, it can be said that it is sufficient that the door lock function can realize continuous operation of the apparatus in the operation region. In other words, a basic requirement of the door lock function of the safety switch is to prevent inadvertent opening of the openable and closable door during the operation of the apparatus. This is because the operation of the apparatus is limited in the operation region by the function of the safety switch for maintaining the operation region in the safe environment when the openable and closable door is inadvertently opened. That is, it can be said that the essential role of the door lock function required for the safety switch is to prevent the operation of the apparatus in the operation region S (FIG. 2) or the box 502 (FIG. 3) from being interrupted by the inadvertent opening of the door PD or 506.

Conventionally, a door lock function of a safety switch has been designed to contribute to maintaining an operation region in a safe environment. Thus, an electromagnet having a strong magnetic force to such an extent that the door is not opened even with a relatively strong operation force has been also adopted for an electromagnetic lock mechanism. However, from a viewpoint of considering the role of the door lock function as allowing the apparatus to continuously operate instead of maintaining the safe environment, the degree of a magnetic force of the electromagnet adopted in the safety switch with an electromagnetic lock mechanism may be the same as or weaker than the conventional case. When the worker performs an operation of opening the door PD, it is possible to prevent the inadvertent opening of the openable and closable door by obtaining an operation force with which the worker can be asked of at least "Are you now performing an operation of opening the door PD according to your will?" regarding the operation force required to open the door PD. In order to open the door PD, if a certain operation force capable of confirming the will of the worker is obtained by the electromagnet, it is possible to prevent the inadvertent opening of the door PD without obtaining any more operation force.

Therefore, optionally, in a case where the degree of the magnetic force of the electromagnet 130 is set to be weaker than the conventional case, for example, in a case where the door PD includes an operating portion such as a door knob, a door latch is released when an operation force for rotating the door knob is applied to the door knob, and at least the electromagnet 130 having a magnetic force stronger than the operation force for releasing the door latch is used. This makes it possible to discourage the worker from opening the door PD, and to prevent the inadvertent opening of the door PD. Then, it is possible to avoid unexpected interruption of the operation of the apparatus caused by the inadvertent opening of the door PD.

Figure 5:
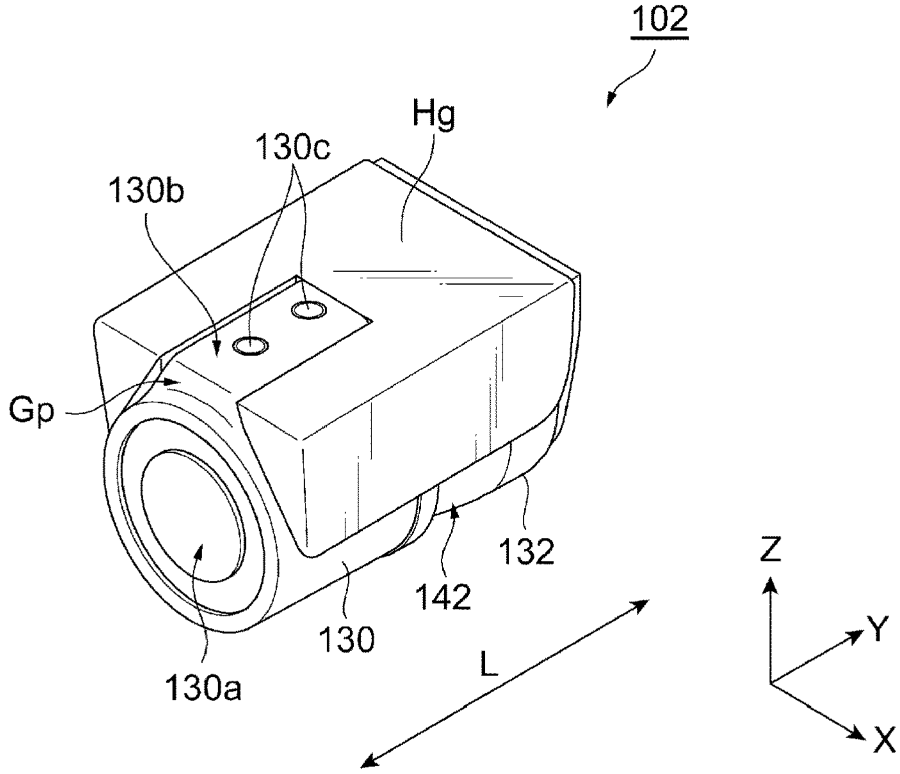
FIG. 5 is a perspective view of a switch body, which is another component of the safety switch of the embodiment as viewed obliquely from the front and obliquely from above.

Referring to FIG. 5, the switch body 102 has a screw hole 130*c* as an attachment portion for fixing the switch body 102 to the door opening frame 2 which is a fixed portion of the compartment system 1. More specifically, the electromagnet 130 has a protrusion 130*b* protruding along a direction from the center of the attracting surface 130*a* toward the outside, and the screw hole 130*c* is provided in the protrusion 130*b*. When description is given with reference to the arrangement example illustrated in FIG. 2, the switch body 102 is fixed to the upper horizontal frame portion 2*b* of the door opening frame 2 via the first bracket 106 having an L-shaped cross section (FIG. 2). When description is given with reference to the arrangement example of FIG. 2, the protrusion 130*b* is located so as to protrude from an upper portion of the electromagnet 130, a flat top surface of the protrusion 130*b* constitutes an attachment surface, and the screw hole 130*c* is provided in the attachment surface. This attachment surface may be formed on a side surface of the electromagnet 130.

For example, FIG. 5 illustrates the arrows X, Y, and Z indicating three directions orthogonal to each other. Directions indicated by the arrows X, Y, and Z all correspond to arrangement attitudes of the safety switch 100, and the directions indicated by the arrows X, Y, and Z are referred to as an X-axis direction, a Y-axis direction, and a Z-axis direction, respectively. The Y-axis direction indicates a normal direction of the attracting surface 130*a* of the electromagnet 130. The Z-axis direction indicates a direction which is orthogonal to the Y-axis direction and parallel to the attracting surface 130*a*, and in which the protrusion 130*b* protrudes with respect to the center of the attracting surface 130*a*. The X-axis direction indicates a direction parallel to the attracting surface 130*a* and orthogonal to the Z axis. As illustrated in FIG. 2, since the safety switch 100 of the present embodiment is arranged such that the attracting surface 130*a* faces the door PD in the closed state, a normal direction of the door PD in the closed state coincides with the Y-axis direction. Further, the safety switch 100 of the present embodiment is arranged such that a direction in which the protrusion 130*b* protrudes with respect to the center of the attracting surface 130*a* is orthogonal to an extending direction of the upper side frame portion 6*a* of the door PD in the closed state and an extending direction of the upper side horizontal frame portion 2*b* of the door opening frame 2. Thus, in the present embodiment, the extending direction of the upper side frame portion 6*a* and the extending direction of the upper side horizontal frame portion 2*b* coincide with the X-axis direction, and a direction toward the operation region S with respect to the door PD, that is, a depth direction of the operation region S coincides with the Y-axis direction. Note that, in the following description, a direction from the door PD in the closed state toward the attracting surface 130*a* in a Y axis direction and an opposite direction thereof are sometimes referred to as "rear or rearward" and "front or forward", respectively, and a direction from the attracting surface 130*a* toward the protrusion 130*b* in a Z axis direction and an opposite direction thereof are sometimes referred to as "above, upper side, or upward" and "below, lower side, or downward", respectively.

Figure 6:
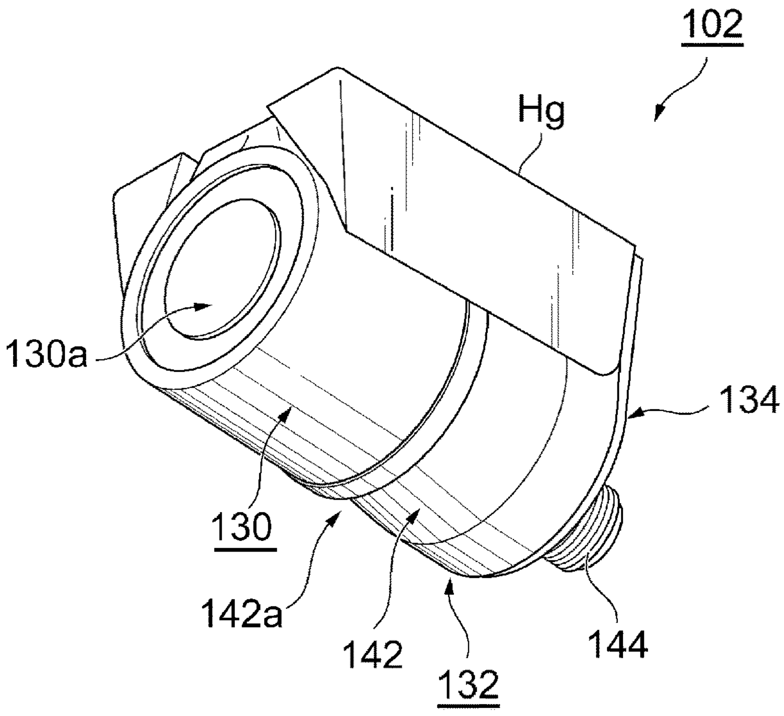
Figure 7:
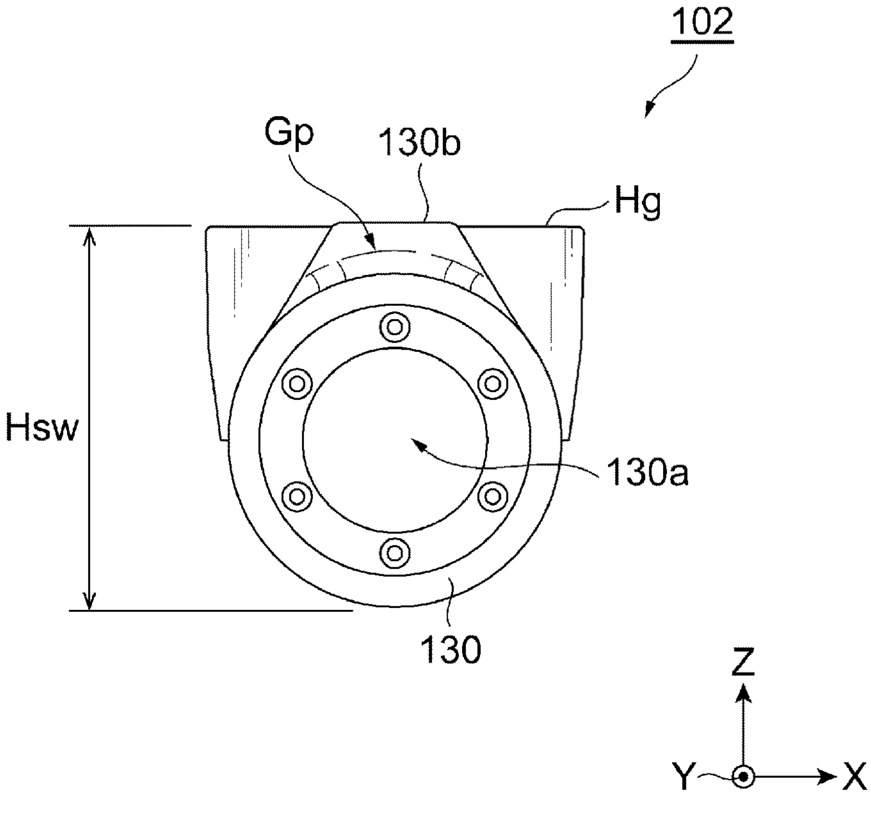
FIG. 7 is a front view of the switch body illustrated in FIG. 5.
Figure 8:
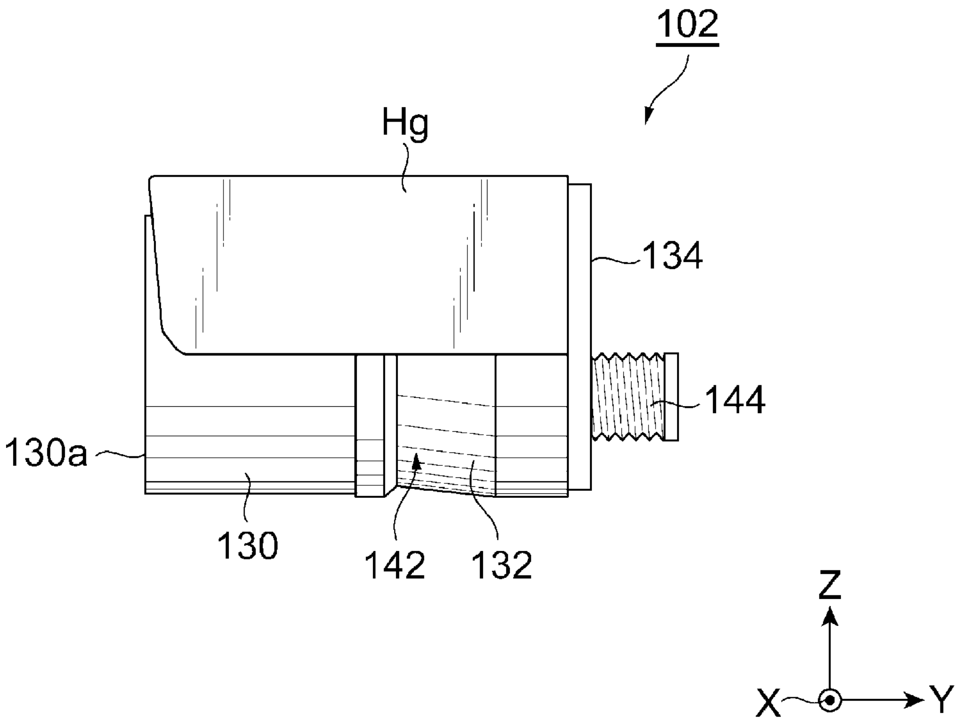
FIG. 8 is a side view of the switch body illustrated in FIG. 5.

FIGS. 5 to 11 are views related to the switch body 102. FIG. 5 is a perspective view of the switch body 102. FIG. 7 is a front view. FIG. 8 is a side view. As can be most clearly seen from FIG. 8, the switch body 102 has a substantially cylindrical shape extending in the Y-axis direction (normal direction of the attracting surface 130*a*). The switch body 102 includes the electromagnet 130 including the attracting surface 130*a* constituting one end surface on the front side in the Y-axis direction, and a length L (FIG. 5) from the attracting surface 130*a* to the other end surface is longer than a diameter of the attracting surface 130*a*. The attracting surface 130*a* forms the main part of a front end surface of the switch body 102. Specifically, the one end surface of the switch body 102 is formed with the attracting surface 130*a*. When description is given more specifically with reference to FIGS. 5 to 8, in a case where a housing Hg is provided around the electromagnet 130, the attracting surface 130*a* protrudes from an end surface 132*c* of the housing Hg, and the attracting surface 130*a* forms the front end surface of the switch body 102. As described above, when the door PD is closed, the attracting surface 130*a* faces the door PD or the actuator 104 of the door PD.

As illustrated in FIG. 5, the switch body 102 includes the housing Hg including the board accommodating portion 132 that accommodates the boards, and a display unit 142 that performs display corresponding to the safety-related output that is output from the safety switch 100 based on a detection result of the actuator 104. A connection portion is formed on a back surface side of the electromagnet 130, that is, on a side opposite to the attracting surface 130*a* in the Y-axis direction, and the electromagnet 130 and the housing Hg are connected by the connection portion. The board accommodating portion 132 is located on a side opposite to the attracting surface 130*a* of the electromagnet 130 in the Y-axis direction. In other words, the board accommodating portion 132 is located at the rear of the electromagnet 130 or on the back surface side of the electromagnet 130. Thus, a dimension in the X-axis direction and a dimension in the Z-axis direction of the entire switch body 102 are less likely to be larger than a dimension in the X-axis direction and a dimension in the Z-axis direction of the electromagnet 130. Further, the display unit 142 is located in the housing Hg on the side opposite to the attracting surface 130*a* with respect to the electromagnet 130 in the Y-axis direction. The switch body 102 has a shape in which a dimension in the Y-axis direction is larger than both the dimension in the X-axis direction and the dimension in the Z-axis direction. Thus, an area occupied by the opening formed in the door opening frame 2 is likely to be smaller when viewed from the front as compared with other switch bodies that require the same capacity.

As illustrated in FIG. 6, the display unit 142 is provided in the switch body 102 at a position that is easily visible from the lower side opposite to the upper side where an attachment hole 130*c* is provided. More specifically, the switch body 102 has a substantially cylindrical outer shape as an axis in the normal direction of the attracting surface 130*a* by the electromagnet 130 and the housing Hg. When the switch body 102 is regarded as the substantially cylindrical shape, the display unit 142 is provided so as to include a portion on the opposite side of a portion where the attachment hole 130 is provided on a circumferential surface thereof. As a result, the display unit 142 is located at a position that is easily visible from the outside of the operation region S even when being arranged inside the operation region S. Further, an outer surface of the display unit 142 has a shape in which a portion below the outer surface of a normal of the outer surface below is inclined downward toward the front. Note that, in the present embodiment, the switch body 102 has a substantially columnar outer shape, but may have a substantially prismatic outer shape by the electromagnet 130 and the housing Hg. In this case, the switch body 102 is provided with the display unit 142 on a side surface having a substantially prismatic shape.

FIG. 7 is the front view of the switch body 102 as viewed from the front. A normal direction of the paper surface of FIG. 7 is parallel to the Y-axis direction. As described above, the board accommodating portion 132 is located at the rear of the electromagnet 130. Thus, when the switch body 102 is viewed from the front, most of the housing Hg including the board accommodating portion 132 is hidden by the electromagnet 130 as seen from FIG. 6. Therefore, it is possible to suppress an increase amount of an area occupied by the switch body 102 when viewed from the front caused by providing the housing Hg. In the present embodiment, a ratio of an area occupied by the housing Hg to an area occupied by the attracting surface 130*a* is small when viewed from the front. Further, the diameter D1 (FIGS. 4 and 23) of the iron piece 120 included in the actuator 104 is designed to be larger than a diameter D2 (FIG. 23) of the attracting surface 130*a* in the present embodiment as will be described later. Therefore, in a state in which the electromagnet 130 attracts the iron piece 120, most of the switch body 102 is hidden by the actuator 104 when viewed from the front.

As illustrated in FIG. 7, in a region occupied by the housing Hg when viewed from the front, a region located on a side where the screw hole 130*c* is provided with respect to the center of the attracting surface 130*a* is larger than a region located on a side opposite to the side where the screw hole 130*c* is provided with respect to the center of the attracting surface 130*a*. In other words, most of the housing Hg is located above the center of the attracting surface 130*a* in the front view. When the switch body 102 is fixed by screw hole 130*c*, a dead space is generated between a portion of the attracting surface 130*a* having a maximum dimension in the X-axis direction and the door opening frame 2 to which the switch body 102 is attached. When the dead space is utilized as the region where the housing Hg is provided, workability through the door opening frame 2 is less likely to deteriorate. Therefore, the housing Hg is configured such that an area occupied by the housing Hg in the front view is larger on the side where the screw hole 130*c* is provided with respect to the center of the attracting surface 130*a*, whereby the workability of work through the door opening frame 2 in which the switch body 102 is arranged is secured.

Figure 9:
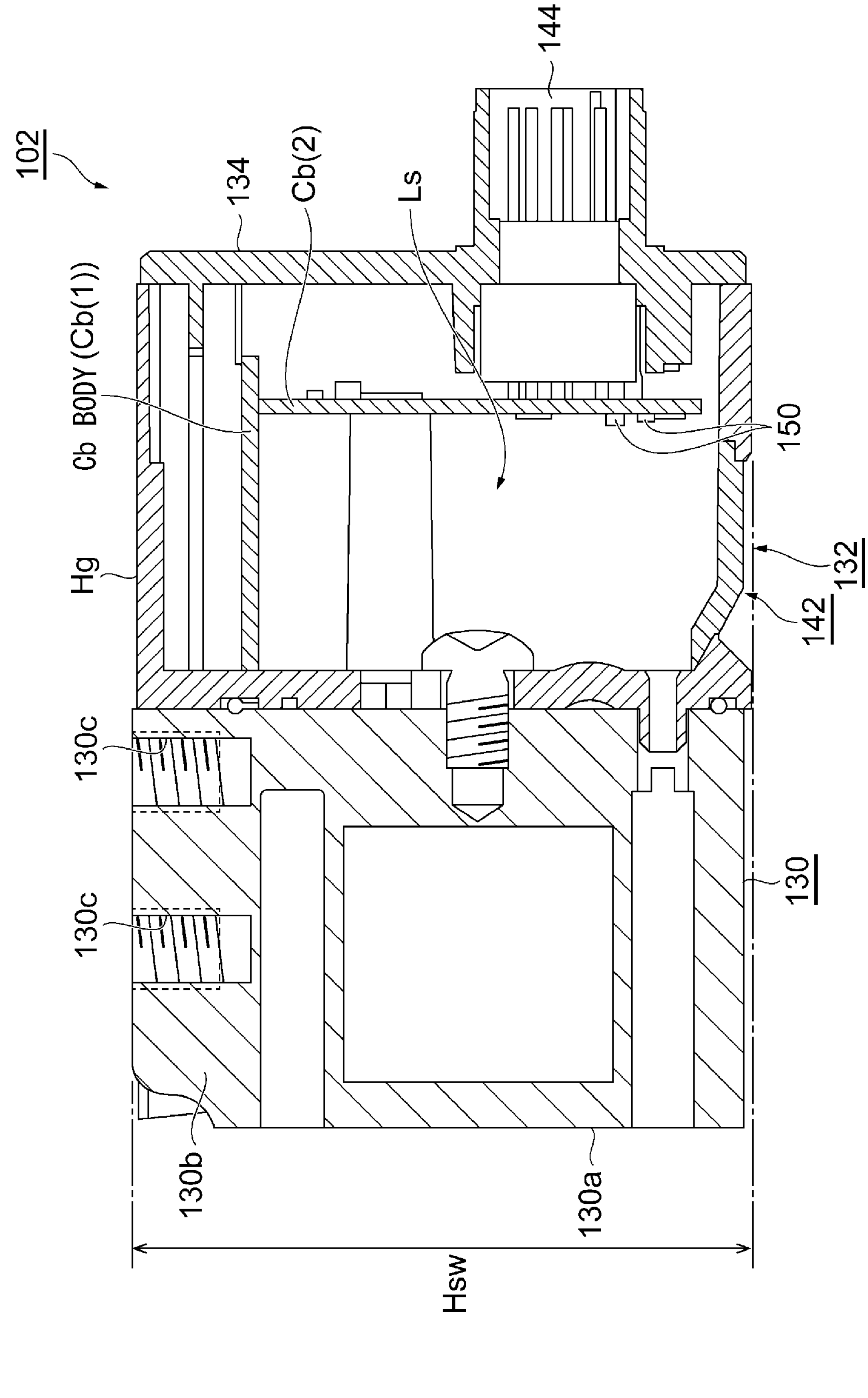
FIG. 9 is a longitudinal cross-sectional view taken along a center line of the switch body illustrated in FIG. 5.

FIG. 8 is the side view of the switch body 102. The switch body 102 has the board accommodating portion 132 on the side opposite to the attracting surface 130*a* with respect to the electromagnet 130 (FIG. 9). Reference sign Hg denotes the housing of the board accommodating portion 132. In the board accommodating portion 132, a connector coupling portion 144 is provided on an end surface 134 on the side opposite to a side where the attracting surface 130*a* is located in the Y-axis direction, that is, on the rear side (FIGS. 8 and 9). The rear end surface 134 is also an end surface of the switch body 102 on the side opposite to the side where the attracting surface 130*a* is located. The connector coupling portion 144 extends in a direction away from the attracting surface 130 along the Y-axis direction. Since the connector coupling portion 144 is provided on the end surface 134 of the board accommodating portion 132, it is unnecessary to position a cable around the switch body 102 regarding the arrangement of the cable connected to the connector coupling portion 144. Further, since the connector coupling portion 144 is provided on the rear end surface 134 of the board accommodating portion 132, at least a portion of the cable connected to the connector coupling portion 144 in the vicinity of the connector coupling portion 144 is located at the rear of the switch body 102. Thus, the cable reduces the possibility that the visibility of the display unit 142 from the front deteriorates. Further, when the cable connected to the connector coupling portion 144 is routed at the rear of the switch body 102 or routed above at a site where the screw hole 130*c* is located, the cable can be routed without being located in the vicinity of the opening formed by the door opening frame 2, so that workability of work through the door opening frame 2 is less likely to deteriorate.

Figure 10:
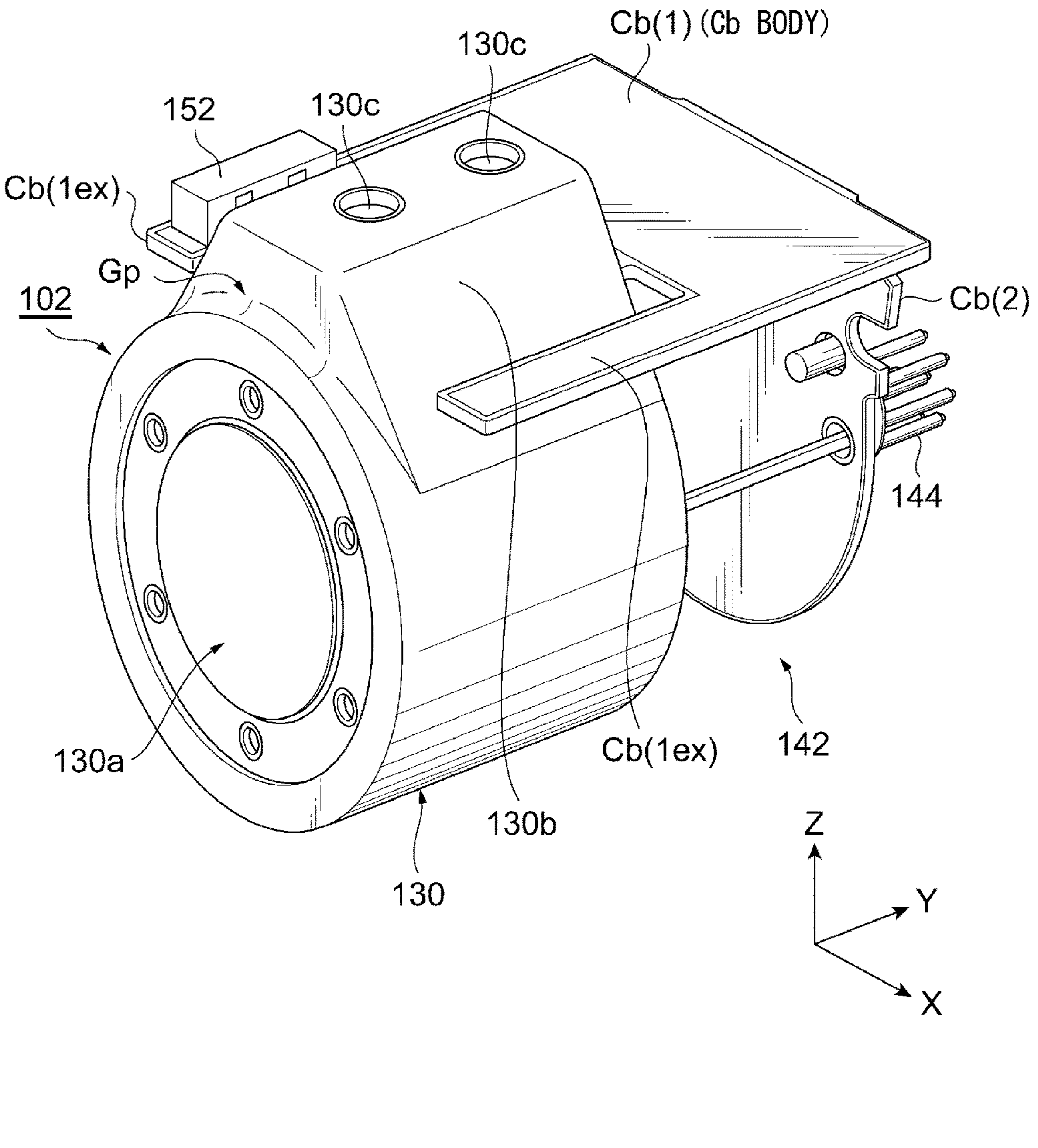
FIG. 10 is a view in which a housing has been removed from the switch body illustrated in FIG. 5.
Figure 11:
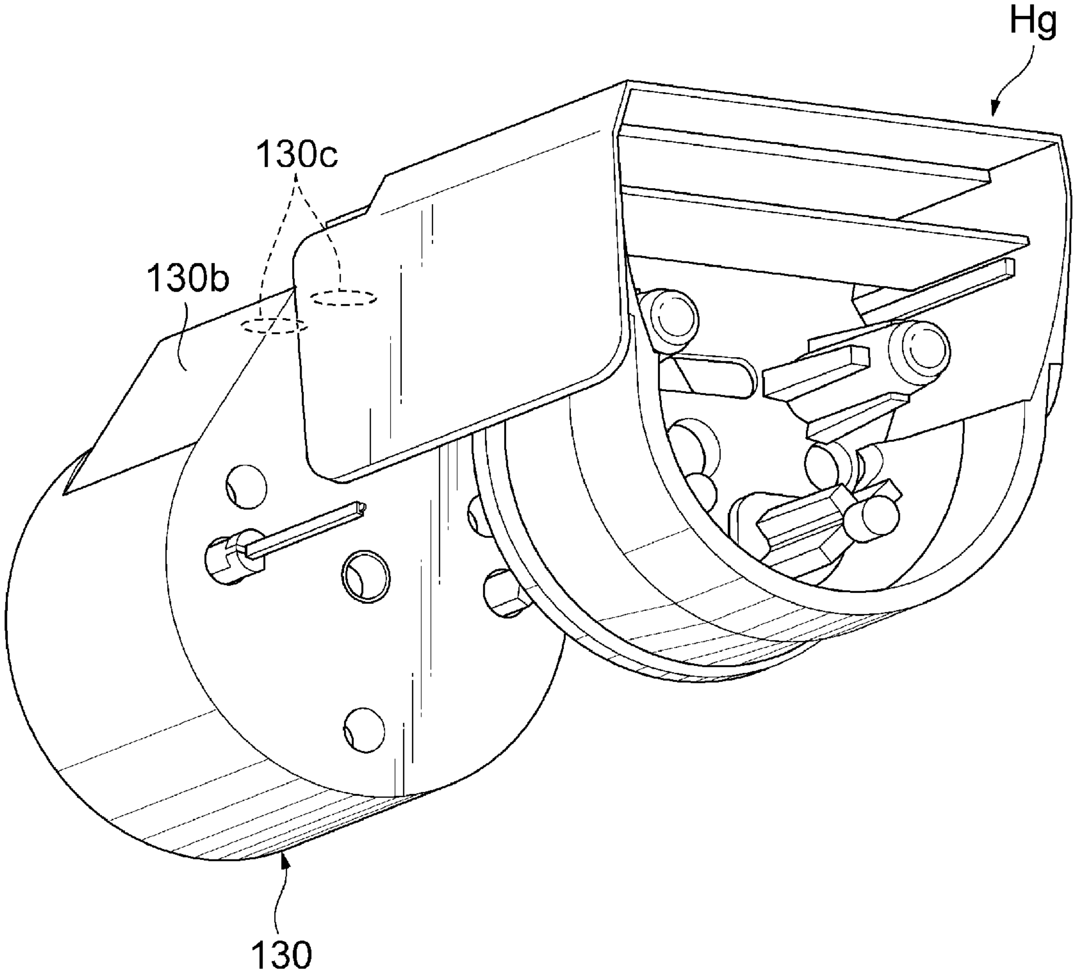
FIG. 11 is an explanatory view in which an electromagnet and the housing of the switch body illustrated in FIG. 5 are separated and viewed obliquely from the rear.

FIG. 9 is a longitudinal cross-sectional view of the switch body 102 taken along the Z-axis direction. FIG. 10 is a view for describing the arrangement of the two boards Cb(1) and Cb(2) arranged in the board accommodating portion 132. FIG. 10 is a perspective view of the switch body 102 in a state in which the housing Hg is detached to expose the accommodating portion 132 as viewed obliquely from the front. FIG. 11 is an exploded perspective view of the electromagnet 130 and the housing Hg, and is a view of the switch body 102 as viewed from the rear.

Referring to FIG. 10, a part of a yoke portion Yk (FIG. 31) of the electromagnet 130 to be described later is formed in a raised shape, and the protrusion 130*b* is formed by the raised portion although not particularly limited. The switch body 102 can be attached such that an attachment portion 103*b* is located on the side although being attached such that the protrusion 130*b* is located at the top in the arrangement example illustrated in FIG. 2.

As can be seen from FIGS. 5 and 9, the protrusion 130*b* in the Z-axis direction has the two screw holes 130*c* separated at the front and rear, that is, in the Y-axis direction, and is fixed to the first bracket 106 having the L-shaped cross section using screws Sc threaded into the two screw holes 130*c* (FIG. 2).

Referring to FIGS. 9 and 10, the first board Cb(1) and the second board Cb(2) are accommodated in the board accommodating portion 132, and the first board Cb(1) and the second board Cb(2) are disposed in an orthogonal state. Specifically, the first board Cb(1) is arranged in an attitude so as to have a plate surface along the Y-axis direction, and the second board Cb(2) is arranged in an attitude so as to have a plate surface along the Z-axis direction. The second board Cb(2) is preferably arranged in a state of hanging down from the first board Cb(1) at a rear end portion of the first board Cb(1) in the state illustrated in FIG. 9.

As described above, the switch body 102 includes at least the display unit 142 (FIGS. 2, 5, and 8) that performs display corresponding to the safety-related output that is output from the switch body 102. The display unit 142 is provided at a position visible from a side opposite to the attachment surface of the switch body 102 where the screw holes 130*c* as the attachment portions are located. That is, the display unit 142 is provided at a position visible from the side where the attachment surface formed by the top surface of the protrusion 130*b* does not exist. When the switch body 102 is fixed to the door opening frame 2, the screw holes 130*c* are arranged and fixed so as to extend to the outer side from the opening formed in the door opening frame 2. Thus, a surface on the side opposite to the attachment surface where the screw holes 130*c* are provided is arranged toward the inner side of the opening. In the example of FIG. 2, the switch body 102 is fixed to the upper side horizontal frame portion 2*b* of the door opening frame 2, a direction from the opening to the outer side is upward. Then, since the inner side of the opening is the lower side for the upper side horizontal frame portion 2*b*, the surface on which the display unit 142 is provided faces the lower side. In a case where the switch body 102 is fixed to a frame portion (a right frame portion on the paper surface of FIG. 1) of the door opening frame 2 on a side opposite to a side where the hinge 4 is provided although being fixed to the upper side horizontal frame portion 2*b* of the door opening frame 2 forming the opening in the present embodiment, the display unit 142 is located on the left side on the paper surface of FIG. 1. Since the display unit 142 is provided on the side opposite to the screw hole 130*c* in this manner, the display unit 142 faces the side of the door opening frame 2 opposite to the frame portion to which the switch body 102 is attached, that is, the inner side of the opening. In a case where the operation region S is viewed from the outer side of the door PD having the transparent board 8, the transparent board 8 is located on the inner side of the opening, and thus, the switch body 102 is visible from the inner side of the opening. Thus, the visibility of the display unit 142 is improved as the display unit 142 is located on the inner side of the opening when being fixed to the door opening frame 2.

The second board Cb(2) is connected to the connector coupling portion 144, and a plurality of indicator lamps 150 (FIG. 9) of different colors, specifically, a plurality of LED elements are mounted on a front surface of a lower portion of the second board Cb(2). The plurality of indicator lamps (LED elements) 150 constitute a light source of the display unit 142. The display unit 142 arranged on the surface on which the switch body 102 installed in the operation region S is visible from the outside has a function of displaying an operating state of the switch body 102 in an identifiable color as is well known.

A modification of an arrangement position of the attachment portion will be described with reference to FIG. 18. Although the attachment hole 130*c* as the attachment portion described with reference to FIG. 5 and the like forms the attachment surface on the surface in the Z-axis direction, an attachment surface 130*c*-2 may be formed on a surface in the X-axis direction as can be seen from FIG. 18. This attachment surface 130*c*-2 is preferably formed on each of two surfaces facing each other in the X-axis direction of the switch body 102. In this modification as well, the display unit 142 is provided on a surface that is not the attachment surface 130*c*-2, which is a lower surface in the illustrated example, and thus, the display unit 142 is visible from below.

Referring to FIG. 9, in the board accommodating portion 132, a limited illumination space Ls is formed by the first board Cb(1) whose plate surface extends from the front to the rear, that is, along the Y-axis direction, and the second board Cb(2) whose plate surface extends along the Z-axis direction. Then, light of an LED 150 mounted on the second board Cb(2) is emitted toward the limited illumination space Ls, and as a result, is displayed through a light transmissive material forming a part of the display unit 142 and forming a part of the housing Hg of the board accommodating portion 132. Of course, the LED 150 forming a light source may be provided on the first board Cb(1).

Figure 12:
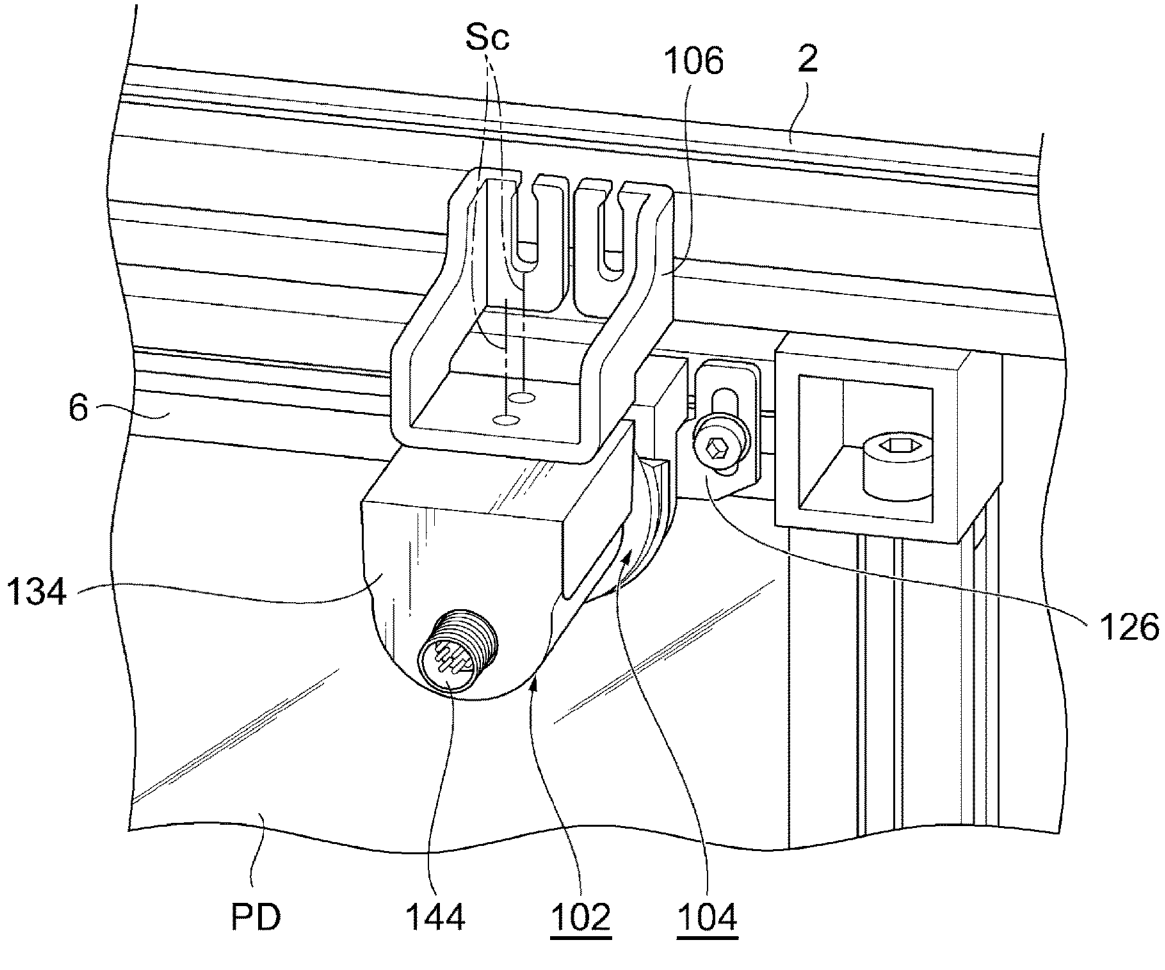
FIG. 12 is a perspective view of the installed safety switch from inside of the operation region and obliquely from above.
Figure 13:
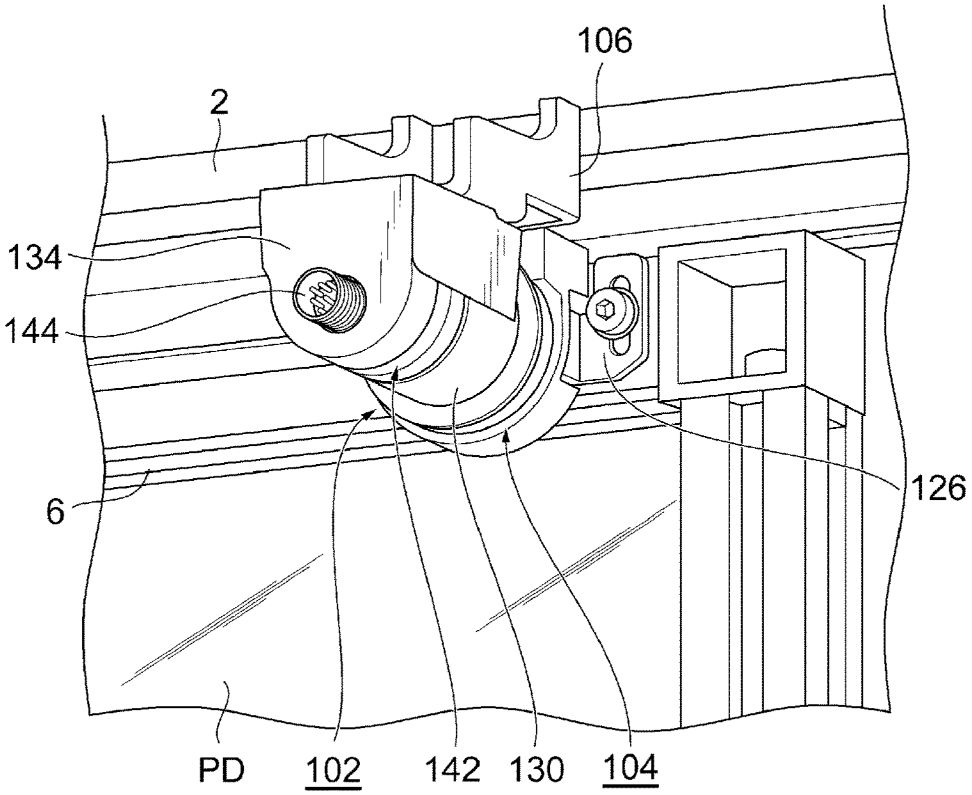
FIG. 13 is a perspective view of the safety switch illustrated in FIG. 12 obliquely from lower.
Figure 14:
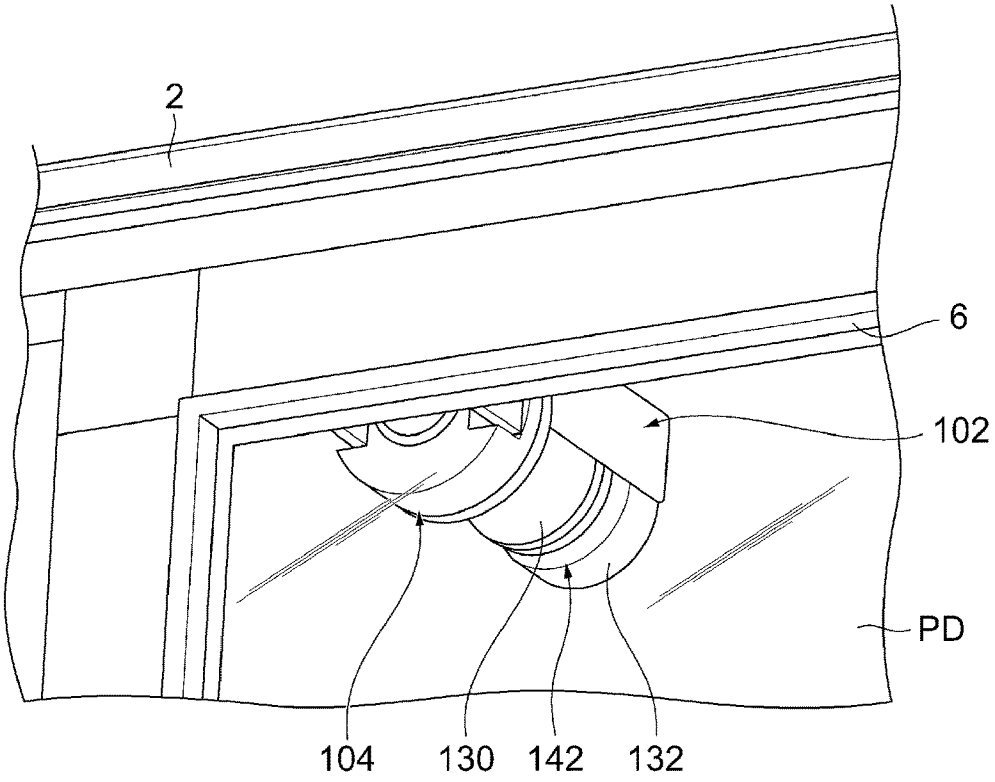
FIG. 14 is a perspective view of a door opening frame of the protective fence and the safety switch installed in a door frame of the openable and closable door as viewed from the outer side of the openable and closable door.
Figure 15:
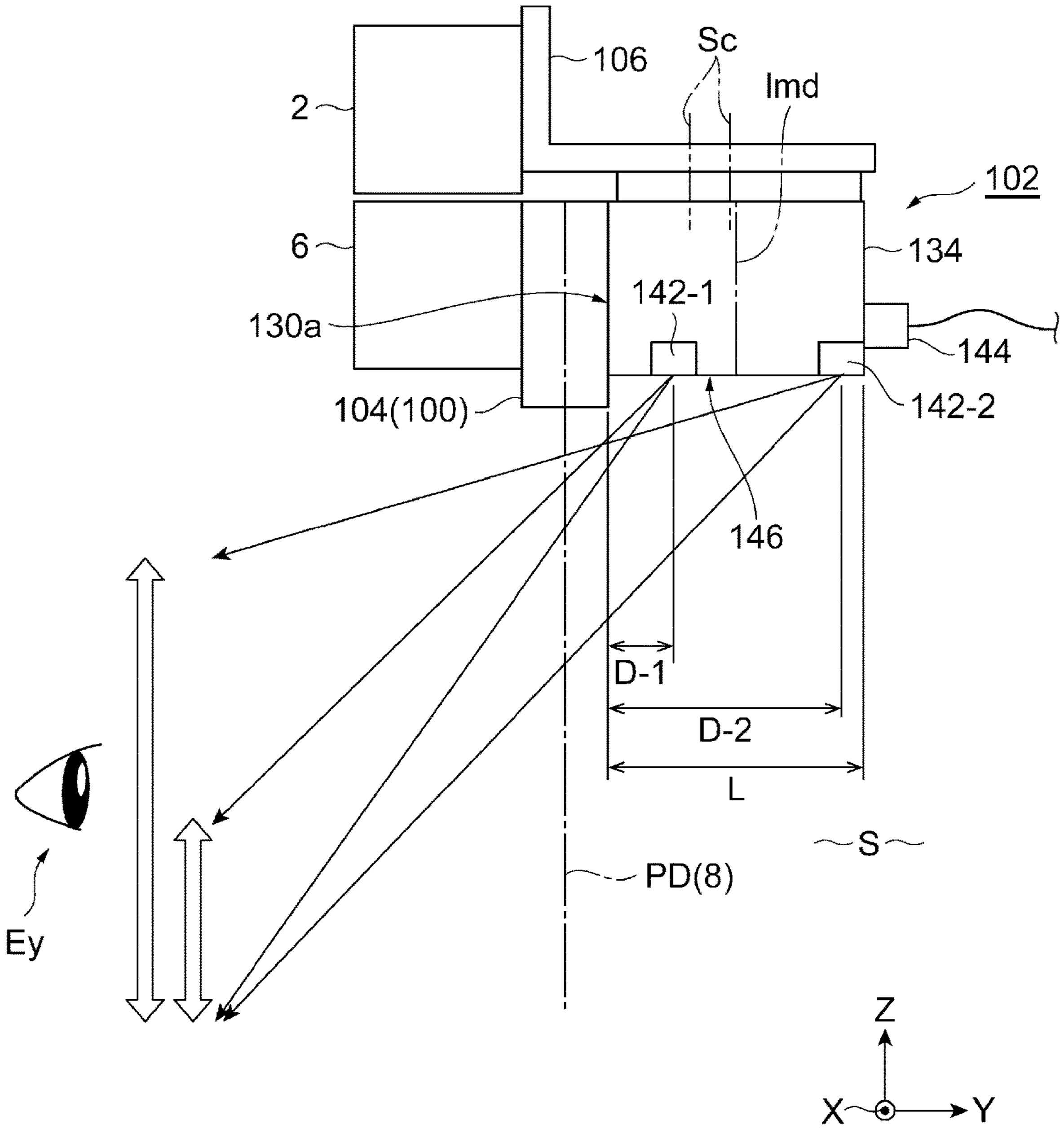
FIG. 15 is a view for describing an operational effect related to arrangement of a display unit of the safety switch of the embodiment.

Alighting state of the display unit 142 is visible from the outer side of the protective door PD through the transparent board 8 (FIG. 2) of the protective door PD. This point will be described with reference to FIGS. 12 to 17. FIGS. 12 and 13 are views of the protective door PD as viewed from the operation region S side. FIG. 14 is a view of the operation region S as viewed from the outer side of the protective door PD. The visibility of the display unit 142 at the time of viewing the switch body 102 from the outside through the door PD when the switch body 102 is arranged inside the operation region S will be described with reference to FIG. 15. FIG. 15 is a schematic view created to describe the visibility of the display unit 142 when the display unit 142 is viewed from the outside of the door PD. In the drawing, reference sign Ey denotes an eye of the worker.

As illustrated in FIG. 12, the first bracket 106 is provided with a portion having a smaller dimension in the Z-axis direction. Accordingly, even in an environment where a ceiling surface is arranged immediately above the first bracket 106, the cable can be arranged via the portion having the smaller dimension in the Z-axis direction. Further, as illustrated in FIG. 13, the surface to be attracted 120*a* of the actuator 104 is slightly larger than the attracting surface 130*a* of the electromagnet 130. Thus, when the display unit 142 is provided near the attracting surface 120*a* in the axial direction of the attracting surface 120*a*, there is a possibility that visual recognition of the display unit 142 is hindered by the actuator 104.

In FIG. 15, reference sign 142-1 denotes a display unit located proximal to the attracting surface 130*a* of the switch body 102. That is, a distance D-1 between the attracting surface 130*a* and the display unit 142-1 in the Y-axis direction is relatively small. Reference sign 142-2 denotes a display unit located distal to the attracting surface 130*e*. A distance D-2 between the attracting surface 130*a* and the display unit 142-2 in the Y-axis direction is relatively large. As can be understood from FIG. 15, it can be seen that the display unit 142 has better visibility when the display unit 142 is viewed from the outside through the door PD in the case of being arranged distally rather than proximally of the attracting surface 130*a* although optional. In the present embodiment, the display unit 142 is arranged at the rear of an intermediate line Imd having a half length of the total length L (FIG. 5) of the switch body 102 in the Y-axis direction. In order to arrange the display unit 142 distal to the attracting surface 130*a*, the display unit 142 of the present embodiment is arranged at the rear of the intermediate line Imd including the intermediate line Imd having a half length of the total length L of the switch body 102 in the Y-axis direction. As described above, at least a part of the display unit 142 is arranged at the rear of the intermediate line Imd, so that the visibility from the front surface side of the switch body 102 can be improved. Further, in the present embodiment, the display unit is provided at a position away from the attracting surface 130*a* in the Y-axis direction, and the side surface of the electromagnet 130 is exposed. According to this configuration, it is possible to achieve both the visibility of the electromagnet 130 whose position needs to be adjusted at the time of fixing the switch body 102 and the visibility of the display unit 142 after the switch body 102 is fixed. Furthermore, in the present embodiment, the display unit 142 is provided such that a front end of the display unit 142 is located at the rear of the intermediate line Imd in the Y-axis direction, that is, away from the attracting surface 130*a* by half of the total length of the switch body 102 or more in the Y-axis direction. Accordingly, the display unit is located only at the rear of the switch body 102, the degree of freedom in attachment of the switch body 102 is improved.

Figure 16:
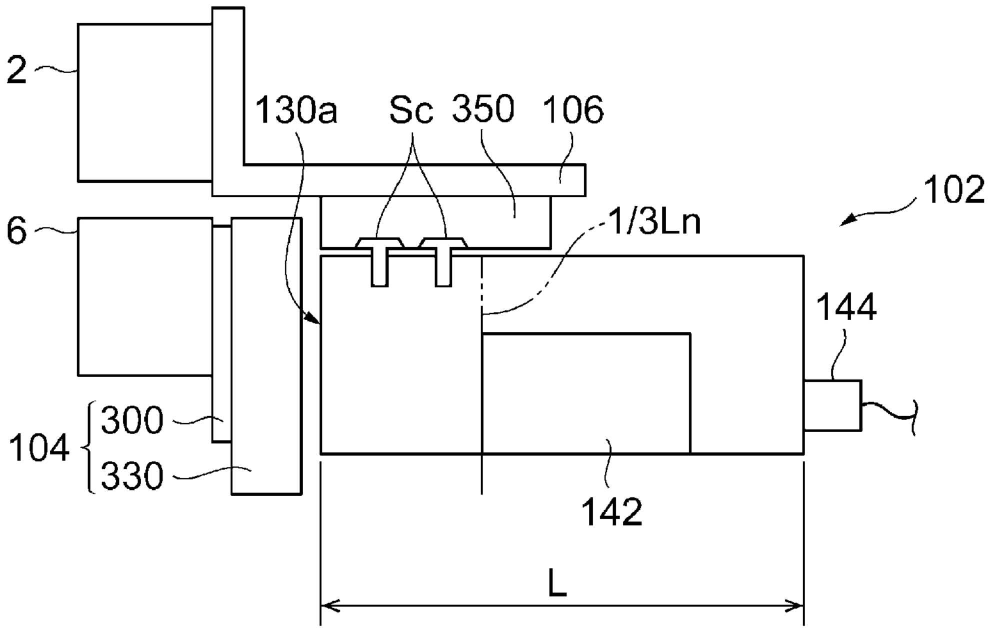
FIG. 16 is a view for describing an example of an arrangement position of the display unit.
Figure 17:
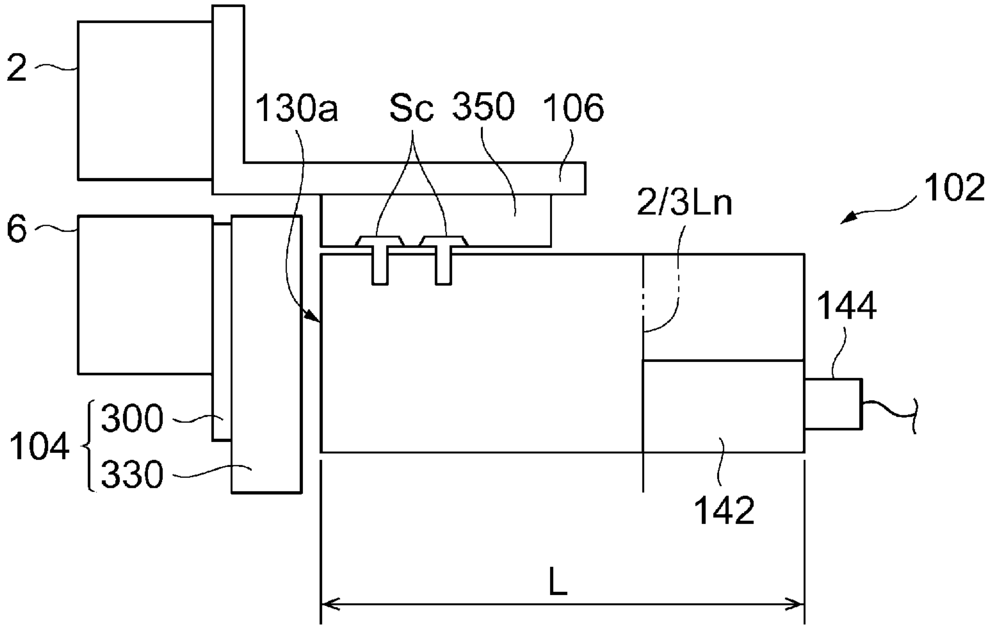
FIG. 17 is a view for describing another example of the arrangement position of the display unit.

FIGS. 16 and 17 are views for describing modifications of an arrangement position of the display unit 142. Reference sign "⅓Ln" in FIG. 16 denotes a first line that is away from the attracting surface 130*a* by ⅓ of the total length L of the switch body 102 in the Y-axis direction. The display unit 142 may be arranged at the rear of the first line ⅓Ln including the first line ⅓Ln of the switch body 102, that is, at a location away from the attracting surface 130*a* farther than the first line ⅓Ln including the first line ⅓Ln. Reference sign "⅔Ln" in FIG. 17 denotes a second line that is away from the attracting surface 130*a* by a length of ⅔ of the total length L of the switch body 102 in the Y-axis direction. The display unit 142 may be arranged at the rear of the second line ⅔Ln including the second line ⅔Ln of the switch body 102. When the display unit 142 is arranged so as to include a position away from the attracting surface 130*a* in this manner, the visibility from a switch front surface side is improved. Further, the electromagnet 130 can be exposed by appropriately separating the display unit 142 from the attracting surface 130*a* in this manner. In particular, when the display unit 142 is arranged at the rear of the first line illustrated in FIG. 16, the side surface of the electromagnet 130 can be sufficiently exposed.

Figure 18:
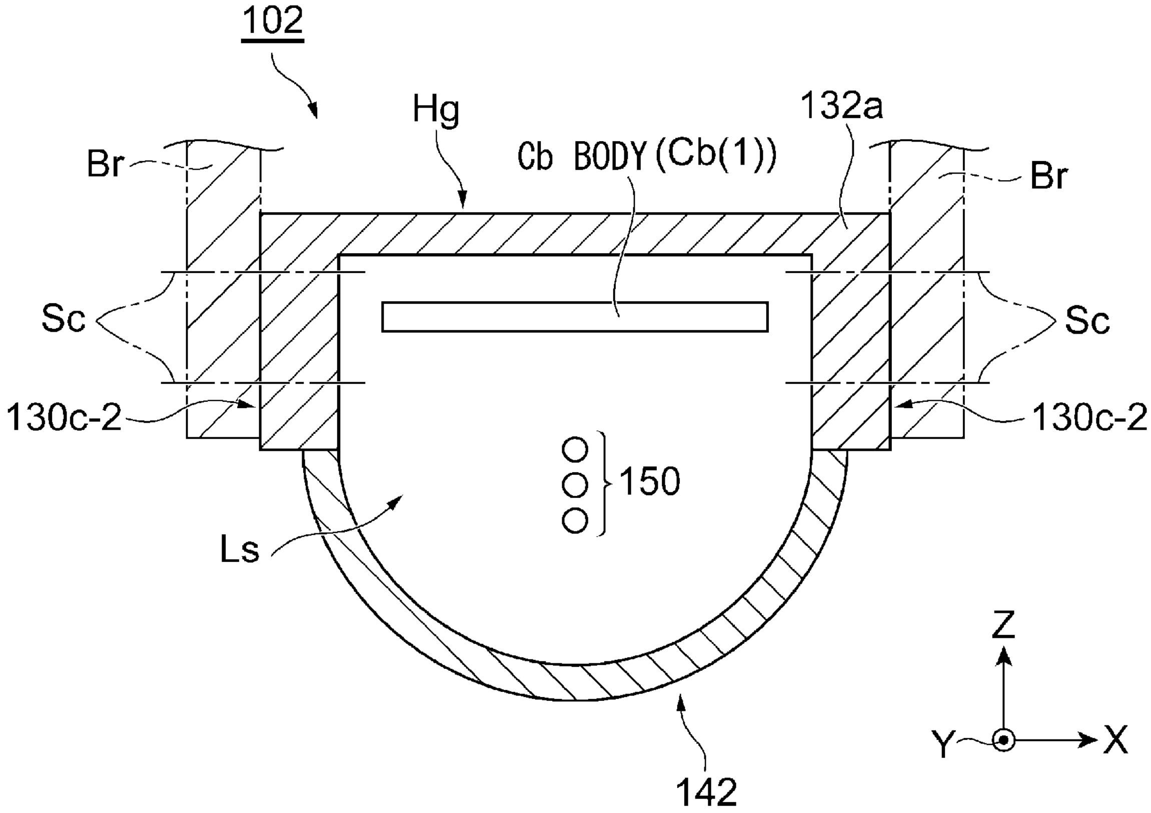
FIG. 18 is a cross-sectional view of the display unit of the safety switch of the embodiment.

The outer surface of the display unit 142 may have a cross-sectional shape that is flat in the Y-axis direction, but has a circumferential surface having a curved cross-sectional shape in this embodiment as can be seen from FIG. 18. FIG. 18 is a cross-sectional view and a schematic view of the display unit 142.

As can be seen from FIG. 18, the display unit 142 extends continuously not only over a lower surface but also over left and right side surfaces when described in a state illustrated in FIG. 18. That is, the display unit 142 has a shape continuously extending in the circumferential direction of the switch body 102. In this manner, the display unit 142 of the switch body 102 has a shape continuously extending from the surface on the opposite side of the protrusion 130*b* in the Z-axis direction, that is, from the lower surface in the illustrated example to both the side surfaces, and preferably extends to half the side surface in the Z-axis direction. According to the arrangement example illustrated in FIG. 2, when the switch body 102 located in the operation region S is viewed from the outside through the door PD, the display unit 142 is visible not only from below the switch body 102 but also from the side. Further, the display unit 142 can be easily visible from the outside even with an attachment attitude different from an attachment attitude of the switch body 102 in FIG. 1.

Further, the outer surface of the display unit 142 has a tapered shape extending downward toward the attracting surface 130*a* in the Y-axis direction in order to enhance the visibility from the outside as can be clearly seen from FIG. 8. In other words, the display unit 142 has a surface inclined toward the front which is the outer side of the operation region Sin the door PD. When the display unit 142 has the shape tapered to the attracting surface 130*a* side, the worker can easily view the display unit 142.

The housing Hg of the board accommodating portion 132 is configured using a plastic molding. Apart of the housing Hg has a shape extending in a direction of the attracting surface 130*a* and surrounds a part of the protrusion 130*b* of the electromagnet 130. The housing Hg has a flat top surface at substantially the same height level as the top surface of the protrusion 130*b* (FIG. 5).

A control circuit that generates a drive signal of the electromagnet 130, a power supply circuit, a communication circuit with the actuator 104, and the like are mounted on a body Cb(body) of the first board Cb(1). On the other hand, an indicator lamp control circuit and the like are mounted on the second board Cb(2).

Referring to FIG. 10, in the board accommodating portion 132, the first board Cb(1) whose plate surface extends along the Y-axis direction has a pair of left and right board extensions Cb(1*ex*) that are long and thin and extend in the Y-axis direction to the vicinity of the attracting surface 130*a* from the body Cb(body) which is located in the board accommodating portion 132 and on which the control circuit and the like are mounted. The pair of board extensions Cb(1*ex*) is located on both sides of the protrusion 130*b* interposed therebetween in the X-axis direction. With the configuration in which the pair of board extensions Cb(1*ex*) is located on both the sides of the protrusion 130*b*, the presence of the board extensions Cb(1*ex*) can prevent an increase in a height dimension of the switch body 102 in the Z-axis direction. Further, a part of the board extension Cb(1*ex*) is arranged at a position overlapping the electromagnet 130 as viewed in the Z-axis direction. Thus, the presence of the board extensions Cb(1*ex*) can reduce an increase in the dimensions of the switch body 102 in the Z-axis direction and the X-axis direction.

In the pair of board extensions Cb(1*ex*), a sensor-side coil (antenna coil) 152 is mounted at a distal end portion of one board extension Cb(1*ex*) (FIG. 10). The sensor-side coil 152 constitutes a detection unit that detects the presence of the actuator 104 within a predetermined range with respect to the switch body 102. Since the sensor-side coil 152 is mounted at the distal end portion of the one board extension Cb(1*ex*), the sensor-side coil 152 can be located close to the attracting surface 130*a* in the Y-axis direction. As a result, the detection capability of the sensor-side coil 152 can be enhanced. As is well known, the sensor-side coil 152 is arranged to correspond to the actuator communication unit 124 of the actuator 104 described above. At this time, the sensor-side coil 152 is covered with the housing Hg made of plastic, instead of metal, in order for the sensor-side coil 152 to detect the actuator communication unit 124. Thus, in the switch body 102, a part of the housing Hg is present on a surface facing the actuator 104 in addition to the attracting surface 130*a*. In the present embodiment, the workability through the door opening frame 2 in which the switch body 102 is arranged can be maintained by arranging a part of the housing Hg in the dead space as described above.

Figure 23:
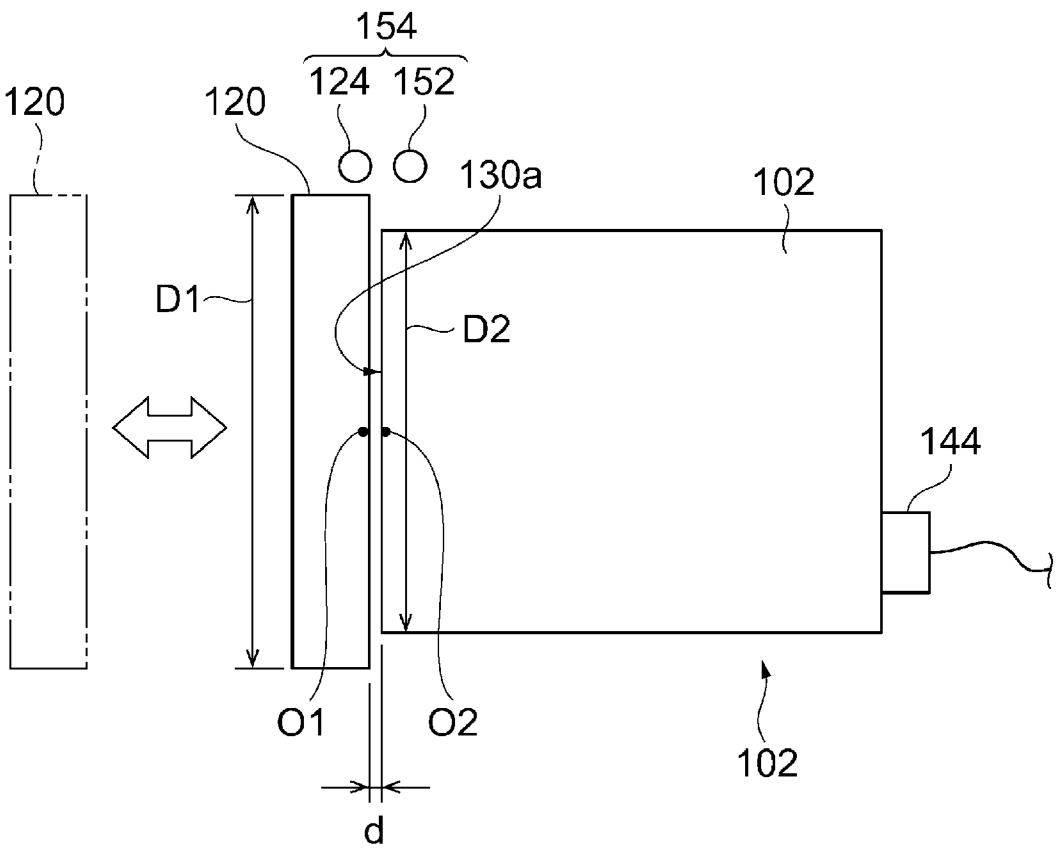
FIG. 23 is a view for describing a preferable arrangement position of the display unit.

For example, in a process of closing the door PD, the iron piece 120 of the actuator 104 approaches the attracting surface 130*a* of the switch body 102 in conjunction with the closing operation of the door PD, and then, the iron piece 120 overlaps the attracting surface 130*a* of the switch body 102 when referring to FIG. 23. The diameter D1 (FIG. 4) of the iron piece 120 (the surface to be attracted 120*a*) is designed to be a value larger than a diameter D2 of the attracting surface 130*a*. Based on a state in which the iron piece 120 overlaps the switch body 102 in a normal state, that is, the normal state in which a center O1 of the iron piece 120 and a center O2 of the attracting surface 130*a* are aligned, the diameter D1 of the iron piece 120 is set relative to the diameter D2 of the attracting surface 130*a* such that an outer edge of the attracting surface 130*a* is located within the surface to be attracted 120*a* of the iron piece 120. As a result, even when the switch body 102 and/or the actuator 104 are/is relatively displaced in an allowable manner, the switch body 102 can fix the actuator 104 with a predetermined attracting force.

In the closed state of the door PD, that is, when the sensor-side coil 152 detects the actuator communication unit, the safety-related output is output to, for example, a control apparatus (for example, a PLC) that controls the apparatus installed in the operation region S (FIG. 2). An RFID detection circuit (not illustrated) related to the sensor-side coil 152 is mounted on the board extension Cb(1*ex*) of the first board Cb(1), and the electromagnet 130 is controlled based on a signal from the sensor-side coil (antenna coil) 152.

Figure 19:
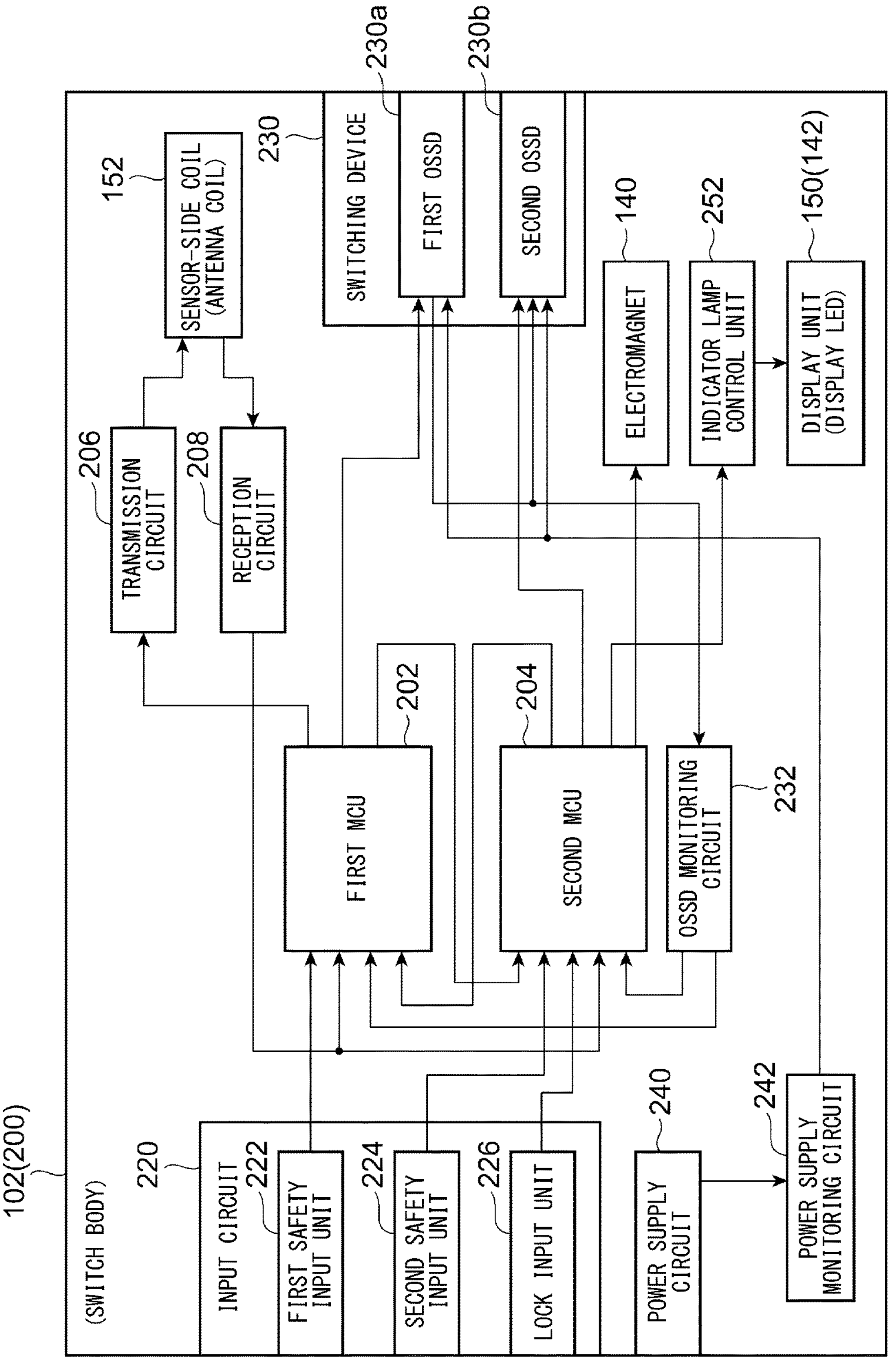
FIG. 19 is a block diagram for describing an electrical configuration of the switch body included in the safety switch of the embodiment.

FIG. 19 is a block diagram for describing an electrical configuration of the switch body 102. The control circuit 200 of the switch body 102 includes a first MCU 202 and a second MCU 204. The first MCU 202 and the second MCU 204 communicate with each other to monitor the counterpart.

The first MCU 202 is connected to a transmission circuit 206. The transmission circuit 206 is connected to the sensor-side coil (antenna coil) 152. The sensor-side coil 152 is connected to a reception circuit 208. The reception circuit 208 is connected to both the first MCU 202 and the second MCU 204. The sensor-side coil 152 is controlled to transmit and receive a radio signal to and from a coil provided in the actuator communication unit 124. The first MCU 202 drives the sensor-side coil 152 via the transmission circuit 206, and supplies a radio signal from the sensor-side coil 152 to the actuator communication unit 124. The actuator communication unit 124 includes at least a coil and a circuit, and is arranged such that the coil is located in a portion covered with the plastic molding 122 as illustrated in FIG. 4. The first MCU 202 and the second MCU 204 receive the radio signal from the actuator communication unit 124 via the sensor-side coil 152 and the reception circuit 208. The RFID 152 includes the sensor-side coil 152 and a response circuit. The actuator communication unit 124 may be a radio tag (RF-ID tag). The response circuit operates using an induced current generated in the sensor-side coil 152 as a power supply. The response circuit demodulates the radio signal received by the sensor-side coil 152 to acquire information, and further transmits a radio signal (response signal) via the sensor-side coil 152.

Figure 20:
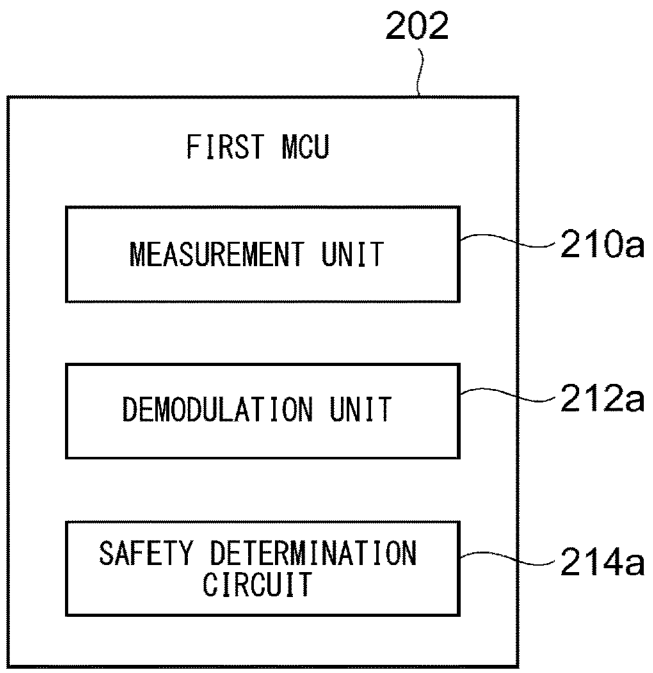
FIG. 20 is a functional block diagram of a first MCU illustrated in FIG. 19.
Figure 21:
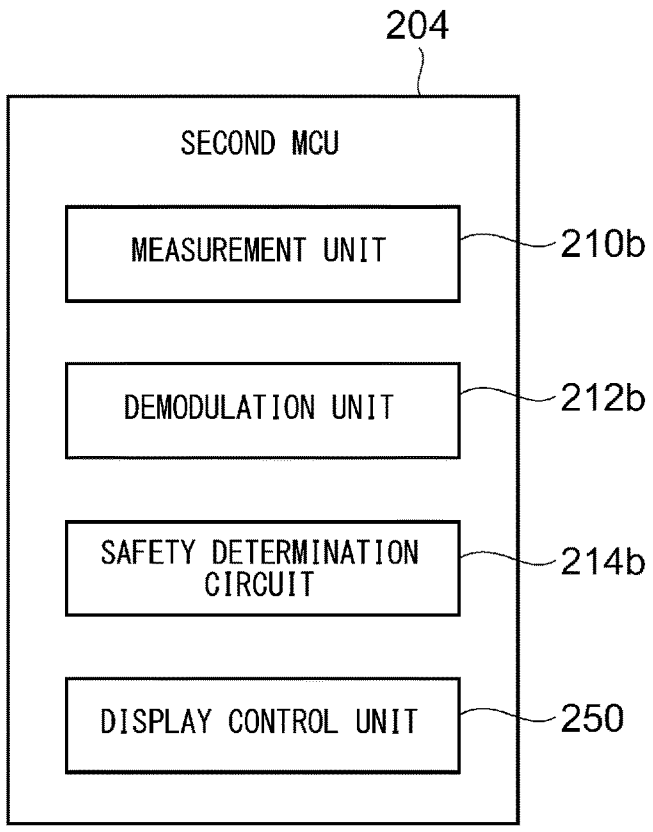
FIG. 21 is a functional block diagram of a second MCU illustrated in FIG. 19.

Referring to FIGS. 20 and 21, each of a measurement unit 210*a* of the first MCU 202 and a measurement unit 210*b* of the second MCU 204 measures the intensity of the radio signal from the actuator communication unit 124 received via the sensor-side coil 152 and the reception circuit 208, and estimate a distance d (FIG. 23) between the switch body 102 and the actuator 104 based on the intensity of the radio signal. Each of a safety determination circuit 214*a* of the first MCU 202 and a safety determination circuit 214*b* of the second MCU 204 determines that the estimated distance d is equal to or smaller than a threshold, that is, whether or not the actuator 104 is within a predetermined range with respect to the switch body 102. In other words, the detection unit that detects that the actuator 104 is within the predetermined range with respect to the switch body 102 is realized by at least the sensor-side coil 152, the reception circuit 208, and the first MCU 202 or the second MCU 204. Note that, instead of the distance d, the intensity of the radio signal may be used as it is to detect a position of the actuator 104. A demodulation unit 212*a* of the first MCU 202 and a demodulation unit 212*b* of the second MCU 204 demodulate information conveyed by radio signals from the actuator communication unit 124 received via the sensor-side coil 152 and the reception circuit 208, respectively, and identify the actuator 104 based on the information. This information may include unique identification information.

The safety determination circuit 214*a* of the first MCU 202 determines whether or not two conditions are satisfied based on the measurement by the measurement unit 210*a* and the identification by the demodulation unit 212*a*, that is, a condition that the estimated distance d is equal to or smaller than the threshold and a condition that the actuator 104 is identified as a predetermined actuator, and transmits a determination result to the second MCU 204. More specifically, there are two types of determination results, that is, a result that both the conditions are satisfied and a result that at least one of the conditions is not satisfied. Similarly, the safety determination circuit 214*b* of the second MCU 204 determines whether or not two conditions are satisfied based on the measurement by the measurement unit 210*b* and the identification by the demodulation unit 212*b*, that is, a condition that the estimated distance d is equal to or smaller than the threshold and a condition that the actuator 104 is identified as the predetermined actuator, and transmits a determination result to the first MCU 202. The safety determination circuit 214*a* of the first MCU 202 outputs a safety-related output determining that the actuator 104 identified as the predetermined actuator is in the predetermined range with respect to the switch body 102, that is, the door PD is in the closed state when the self-determination result matches the determination result of the second MCU. Similarly, the safety determination circuit 214*b* of the second MCU 204 determines that the actuator 104 identified as the predetermined actuator is in the predetermined range with respect to the switch body 102, that is, the door PD is in the closed state when the self-determination result matches the determination result of the first MCU. Note that the first MCU 202 and the second MCU 204 output the safety-related output via an output signal switching device (OSSD) when a condition related to a signal input via an input circuit 220 is also satisfied as will be described later in the present embodiment, but the safety-related output may be output based on the radio signal received via the reception circuit 208 and the mutual determination results of the first MCU 202 and the second MCU 204. Further, the estimation of the distance d between the switch body 102 and the actuator 104 and the identification of the actuator 104 are performed based on the radio signal detected by the sensor-side coil 152 in the present embodiment, but it may be configured such that only the estimation of the distance d is performed, and the safety determination circuit 214*a* or 214*b* outputs the determination result as to whether the distance d is equal to or smaller than the threshold to the other safety determination circuit without performing the determination related to the identification of the actuator 104.

Returning to FIG. 19, the input circuit 220 includes a first safety input unit 222, a second safety input unit 224, and a lock input unit 226. Another device capable of outputting a safety-related output is connected to the first safety input unit 222 and the second safety input unit 224. That is, the first safety input unit 222 and the second safety input unit 224 are input circuits configured for a daisy chain connection between the switch body 102 and the other device. For example, in the first safety input unit 222 and the second safety input unit 224, one of terminals for outputting the safety-related output of the other device is connected to the first safety input unit 222, and the other terminal for outputting a safety-related output of the other device is connected to the second safety input unit 224.

The lock input unit 226 is connected to an external control device such as a safety PLC and a safety control device, receives a lock signal for controlling the lock mechanism output from the external control device, and outputs the input signal to the second MCU 204. The second MCU 204 determines whether or not the signal input via the lock input unit 226 is an ON signal. The second MCU 204 can drive the electromagnet 130 based on the lock signal input via the lock input unit 226 to attract the electromagnet 130 to the iron piece 120 of the actuator 104. That is, the door PD is locked by the magnetic force in accordance with the signal input via the lock input unit 226. Note that the second MCU 204 may drive the electromagnet 130 when the signal input via the lock input unit 226 is the ON signal, or may drive the electromagnet when it is determined that another condition is satisfied in addition to the condition that the signal input via the lock input unit 226 is the ON signal. For example, the above-described determination by the safety determination circuits 214*a* and 214*b* may be a condition for driving the electromagnet 130. In this case, the electromagnet 130 is driven when it is determined that the predetermined actuator 104 is in the state of being within the predetermined range with respect to the switch body 102, the reliability that the door PD maintains the closed state is improved by the lock signal output from the external control device.

The control circuit 200 includes a first OSSD 230*a* and a second OSSD 230*b* as a switching device 230. Each of the first MCU 202 and the second MCU 204 generates a safety signal, the first MCU 202 outputs a safety-related output via the first OSSD 230*a* as the safety signal, and the second MCU 204 outputs a safety-related output via the second OSSD 230*b* as the safety signal. Note that an external device to which the safety-related output is output via the first OSSD 230*a* and the second OSSD 230*b* and the external control device that outputs the lock signal input via the lock input unit 226 may be the same device or different devices, and both of them constitute the compartment system 1.

The first OSSD 230*a* and the second OSSD 230*b* are configured using, for example, PNP transistors. When the PNP transistor is turned on, a positive-side power supply is connected to an output terminal, and thus, an ON signal is output. On the other hand, when the PNP transistor is turned off, the output terminal is grounded via a pull-down resistor, and thus, an OFF signal is output.

An OSSD monitoring circuit 232 may be connected to each of the first OSSD 230*a* and the second OSSD 230*b*. The OSSD monitoring circuit 232 is connected to the first MCU 202 and the second MCU 204. The first MCU 202 monitors whether or not the second OSSD 230*b* normally operates through the OSSD monitoring circuit 232. The second MCU 204 monitors whether or not the first OSSD 230*a* normally operates through the OSSD monitoring circuit 232. For example, each of the first OSSD 230*a* and the second OSSD 230*b* periodically shifts the output signal to OFF for a minute time when outputting the ON signal. The OSSD monitoring circuit 232 determines that the OSSD is normal if OFF for the minute time can be detected during an output period of the ON signal, and determines that the OSSD is not normal if OFF for the minute time is not detectable.

Note that a case where OFF for the minute time is not detectable by the OSSD monitoring circuit 232 and the ON signal continues is caused by, for example, a short circuit between the output terminal and the positive-side power supply. In this case, the safety determination circuits 214*a* and 214*b* output control signals for outputting the OFF signals to the first OSSD 230*a* and the second OSSD 230*b*, respectively. As a result, a normally operating one of the first OSSD 230*a* and the second OSSD 230*b* outputs the OFF signal. Note that the shift of the safety-related output to OFF for monitoring the OSSD monitoring circuit 232 is set to such a minute time that the external device to which the safety-related output is output does not react to this OFF.

A power supply circuit 240 is a DC-DC converter that receives DC+24 V and 0 V from the outside and generates DC voltages such as DC+10 V, +5 V, and +3.3 V. The power supply circuit 240 supplies power to all circuits that require power, such as the control circuit 200, the sensor-side coil 152, and the display unit 142. Meanwhile, in a case where a voltage supplied from an external power supply or a voltage output from the power supply circuit 240 is not within a predetermined range, there is a possibility that the control circuit 200 or the like does operate normally. Therefore, the power supply monitoring circuit 242 determines whether or not the voltage supplied from the external power supply is within the predetermined range, determines whether the voltage output from the power supply circuit 240 is within the predetermined range, and outputs a determination result to the first OSSD 230*a* and the second OSSD 230*b*. When a determination result indicating that the power supply circuit 240 is not operating normally is input, each of the first OSSD 230*a* and the second OSSD 230*b* sets the safety-related output to OFF without depending on the control signal output from the control circuit 200. When a determination result indicating that the power supply circuit 240 is normally operating is input, each of the first OSSD 230*a* and the second OSSD 230*b* outputs the safety-related output depending on the control signal output from the control circuit 200.

The control circuit 200 includes an indicator lamp control unit 252 that controls the display unit 142, and the indicator lamp control unit 252 of the second MCU 204 supplies the indicator lamp control unit 252 with at least a display state signal according to the safety-related output via the second OSSD 230*b*. Since the safety-related output via the second OSSD 230*b* is based on at least a result of the detection as to whether or not the actuator 104 is in the predetermined range with respect to the switch body 102, it can be said that the display control unit 252 generates state information based on the result of detection as to whether or not the actuator 104 is in the predetermined range with respect to the switch body 102. A relationship between ON or OFF of the safety-related output and determination results in the first MCU 202 and the second MCU 204 will be described with reference to FIG. 22.

A column "Indicator lamp" in FIG. 22 indicates a light emission pattern of the display unit 142 controlled based on the display state signal supplied to the display control unit 252, that is, the state information generated by the display control unit 252. A column "State" is subdivided into "OSSD" and "Safety input", "Lock control input", and "Actuator". The column "OSSD" indicates whether the safety-related output, which is output to the external control apparatus via the first OSSD 230*a* and the second OSSD 230*b* as the switching device 230, is ON or OFF. Further, the columns "Safety input", "Lock control input", and "Actuator" indicate determination items used when determining whether to set the safety-related output, which is output via the switching device 230, to ON or OFF. The column "Safety input" indicates whether the safety-related output, input via the first safety input unit 222 and the second safety input unit 224, is ON or OFF. The column "Lock control input" indicates whether the lock signal input from the external control device via the lock input unit 226 is ON or OFF. The column "Actuator" indicates whether or not the actuator 104, which is identified as the predetermined actuator based on the radio signal received via the sensor-side coil 152 and the reception circuit 208, has been detected to be in the predetermined range with respect to the switch body 102.

As illustrated in FIG. 22, in the present embodiment, the safety-related output, which is output via the switching device 230, is set to ON when the safety-related output input via the first safety input unit 222 and the second safety input unit 224 is ON, the lock signal input via the lock input unit 226 is ON, and the actuator 104 has been detected. At this time, the light emission pattern of the display unit 142 is lighting in green. Further, when the actuator 104 is not detected, regardless of the safety-related output via the first safety input unit 222 and the second safety input unit 224 and the lock signal input, the safety-related output, which is output via the switching device 230 set to OFF, and the light emission pattern of the display unit 142 is lighting in red. The safety switch 100 of the present embodiment detects whether the actuator 104 is within the predetermined range with respect to the switch body 102 in order to maintain the operation region S in the safe environment. When the actuator 104 is not detected, the door PD is not in the closed state, and the operation region S is not maintained as the safe environment. Thus, regardless of input states of other signals, the safety-related output, which is output via the switching device 230, is set to OFF.

In addition to the detection of the actuator 104, the safety switch 100 of the present embodiment refers to input states of various signals and determines whether to set the safety-related output, which is output via the switching device 230, to ON or OFF. At this time, as compared with the detection by the actuator 104, it is difficult for the worker to grasp which state the safety-related output via the first safety input unit 222 and the second safety input unit 224 or the lock signal input is in. More specifically, whether or not the actuator 104 is detected has a certain correlation with whether or not the door PD is in the closed state. Thus, in a case where the actuator 104 is not detected and the safety-related output, which is output from the switch body 102 via the switching device 230, is set to OFF, the worker can easily specify the cause thereof. On the other hand, regarding the safety-related output via the first safety input unit 222 and the second safety input unit 224 or the lock signal input, the worker can confirm whether or not the cable corresponding thereto is connected and the like by appearance, but hardly grasps any state of the signal supplied via such a cable by appearance. Thus, in the present embodiment, when the safety-related output that is output via the switching device 230 is OFF due to input states of various signals, the light emission pattern of the display unit 142 is changed according to the input states of the various signals in the present embodiment such that the worker can easily specify the reason why the safety-related output, which is output from the switch body 102 via the switching device 230, is OFF.

Note that, in the present embodiment, the safety-related output that is output from the switch body 102 and the light emission pattern of the display unit 142 are changed according to the column "Safety input" in FIG. 22 since the other device capable of outputting the safety-related output is connected to the first safety input unit 222 and the second safety input unit 224. However, in a case where the other device is not connected, the safety-related output that is output from the switch body 102 and the light emission pattern of the display unit 142 may be determined according to the column "Lock control input" and the column "Actuator". In this case, when the column "Lock control input" is "ON" and the column "Actuator" is "Detected", the safety-related output that is output by the switch body 102 is set to ON, and the light emission pattern of the display unit 142 is lighting in green. Further, in this case, there is no case where the light emission pattern of the display unit 142 is "orange" or "blinking in orange" as illustrated in FIG. 22.

Figure 24:
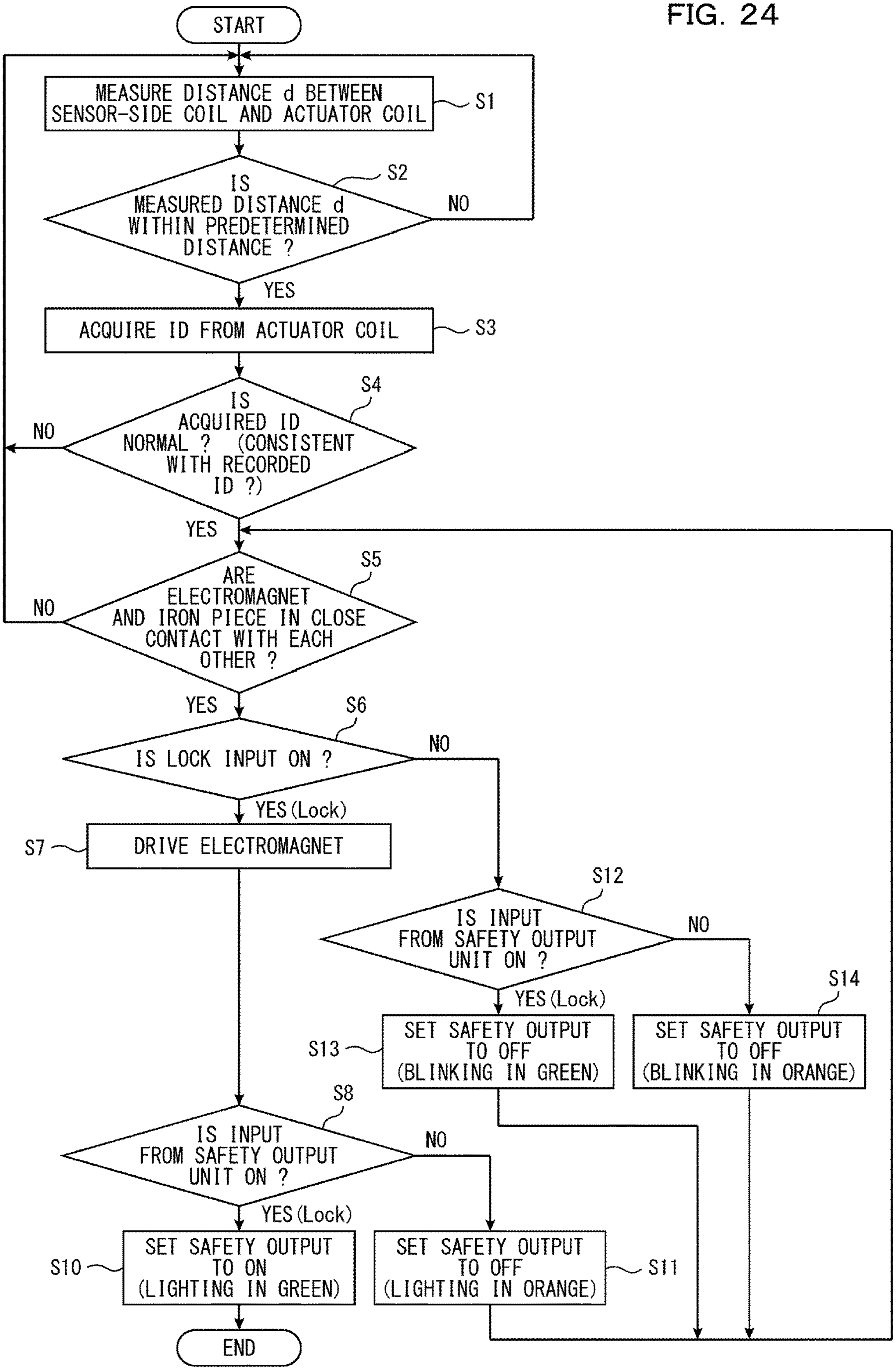
FIG. 24 is a flowchart for describing control executed by the first MCU and/or the second MCU.

Regarding the above-described control of the display unit 142, control executed by the first MCU 202 and the second MCU 204 will be described based on a flowchart illustrated in FIG. 24. In Step S1, the sensor-side coil 152 (FIG. 19) of the switch body 102 and the actuator communication unit 124 (FIG. 4) of the actuator 104 measure the distance d (FIG. 23) between the iron piece 120 and the electromagnet 130. In the next Step S2, it is determined whether or not the measured distance d is within a predetermined range, and if Yes (within the predetermined distance), an ID is acquired from the actuator communication unit 124 (S3).

In the next Step S4, when it is confirmed that the acquired ID matches a recorded ID, the flow proceeds to the next Step S5 to determine whether or not the electromagnet 140 of the switch body 102 and the iron piece 120 of the actuator 104 are in close contact with each other.

As described above, each of the measurement unit **210*a* of the first MCU 202 and the measurement unit 210*b* of the second MCU 204 measures a radio signal from the actuator communication unit (RFID) 124 (FIG. 4) received via the sensor-side coil 152 (FIG. 10) to estimate the distance d between the actuator 104 and the switch body 102. If the estimated distance d is within the predetermined range, the ID is acquired from the actuator communication unit 124, and it is confirmed whether the acquired ID matches the recorded ID. After confirming that the ID matches the recorded ID, it is determined whether or not the electromagnet 130 and the iron piece 120 are in close contact with each other. At this time, each of the first MCU 202 and the second MCU 204 determines whether or not the distance d2 between the attracting surface 130*a* and the surface to be attracted 120*a* is equal to or smaller than a threshold by a unit different from a unit used to determine whether or not the distance d is within the predetermined range. When the distance d2 between the attracting surface 130*a* and the surface to be attracted 120*a* is equal to or smaller than the threshold and the lock signal input via the lock input unit 226 is ON, the second MCU 204 drives the electromagnet 130 to attract the iron piece 120**.

Figure 25:
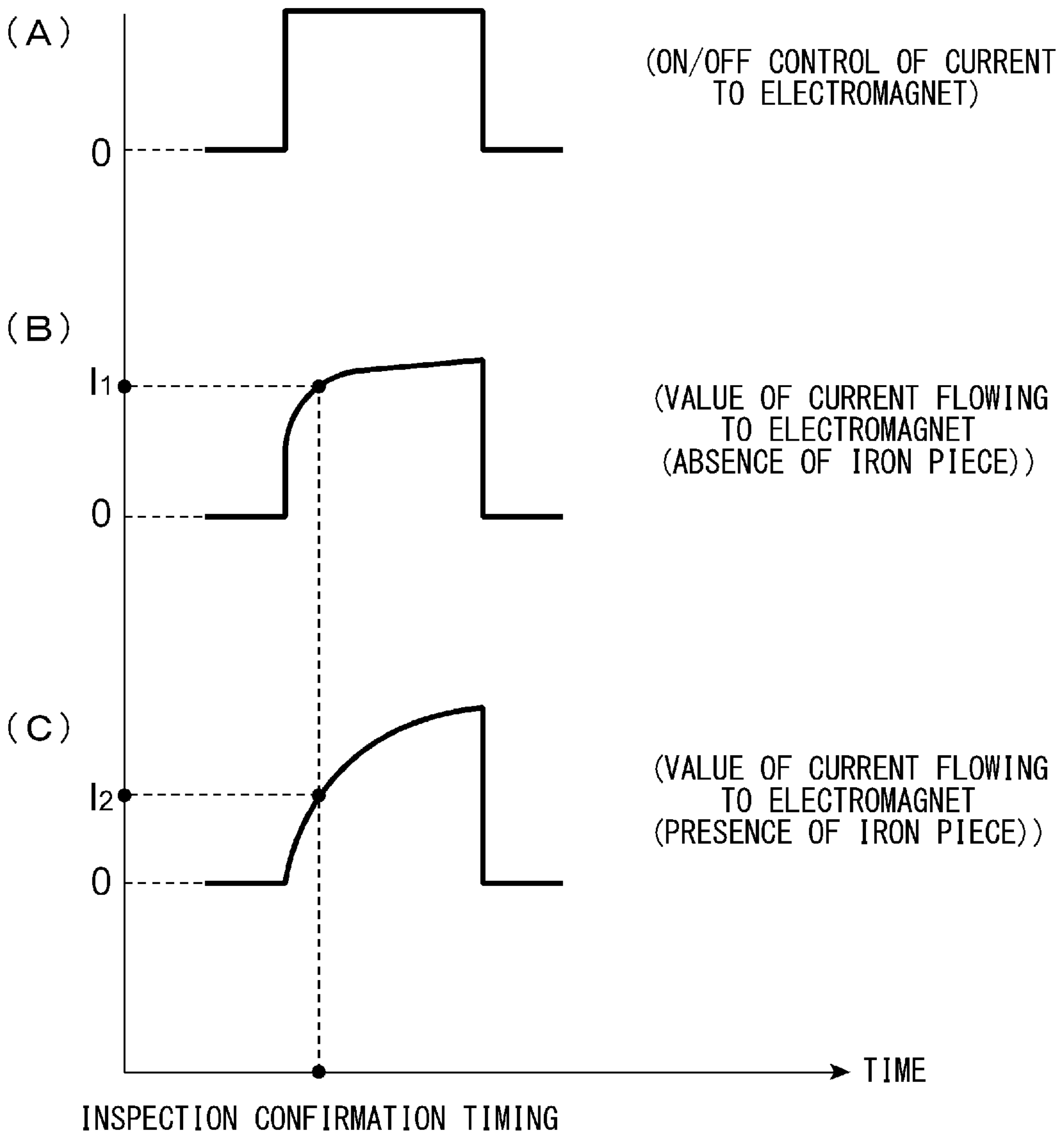
FIG. 25 is a view comparing currents for describing a method for determining whether or not an iron piece is in close contact with the electromagnet.

The determination as to whether or not a distance d2 is equal to or smaller than a threshold will be specifically described with reference to FIG. 25. The second MCU 204 supplies an inspection current to the electromagnet 130, and monitors a current flowing through the electromagnet 130 at this time. In FIG. 25, (A) illustrates a rectangular wave of the inspection current. A value of the inspection current is smaller than a value of a lock current supplied to the electromagnet 130 to maintain the closed state of the door PD, that is, to form a locked state of the safety switch 100. If a current having the same value as the value of the lock current is adopted for inspection, even if the lock signal is not ON, the electromagnet 130 attracts the iron piece 120 with an attracting force enough to maintain the door PD in the closed state, and thus, an operation of opening the door PD is hindered, and the workability of the worker is deteriorated. In this regard, when the value of the inspection current is set to a value smaller than the value of the lock current, particularly to a weak value to such an extent that the electromagnet 130 hardly exhibits the attracting force, the workability of the worker can be maintained.

In FIG. 25, (B) illustrates a monitoring current flowing to the electromagnet 130 to correspond to the inspection current of the rectangular wave in (A) of FIG. 25 in a state in which the electromagnet 130 and the iron piece 120 are not in close contact with each other, that is, a state in which the distance d2 between the attracting surface 130*a* and the surface to be attracted 120*a* is larger than a threshold. In FIG. 25, (C) illustrates a monitoring current flowing to the electromagnet 130 to correspond to the inspection current of the rectangular wave in (A) of FIG. 25 in a state in which the electromagnet 130 and the iron piece 120 are in close contact with each other, that is, a state in which the distance d2 between the attracting surface 130*a* and the surface to be attracted 120*a* is equal to or smaller than the threshold. As can be seen from comparison between (B) and (C) in FIG. 25, in the state in which the electromagnet 130 and the iron piece 120 are in close contact with each other, that is, the state in which the distance d2 between the attracting surface 130*a* and the surface to be attracted 120*a* is smaller than the threshold, an inductance is higher than that in the state in which the distance d2 is equal to or larger than the threshold. Thus, the period of time from a time point at which the supply of the inspection current has been started to a time point at which a value of the monitoring current reaches a certain value increases.

When there is a difference in the period of time until the value of the monitoring current reaches a certain value from the time point when the supply of the inspection current has been started, there is a difference in a value of a current flowing through the electromagnet 130 at a timing when a certain period of time has elapsed since the start of supply of the inspection current. For the comparison between (B) and (C) in FIG. 25, the timing when a certain period of time has elapsed since the start of supply of the inspection current to the electromagnet 130 is illustrated as an inspection confirmation timing. A value of a current at the inspection confirmation timing of the monitoring current flowing through the electromagnet 130 in the state in which the distance d2 between the attracting surface 130*a* and the surface to be attracted 120*a* is larger than the threshold is a first monitoring current value I1 illustrated in (B) of FIG. 25. Further, a value of a current at the inspection confirmation timing of the monitoring current flowing through the electromagnet 130 in the state in which the distance d2 between the attracting surface 130*a* and the surface to be attracted 120*a* is equal to or smaller than the threshold is a second monitoring current value I2 illustrated in (C) of FIG. 25. When comparing the first monitoring current I1 and the second monitoring current value I2, the first monitoring current value I1 is larger. That is, the monitoring current ((B) in FIG. 25) reaching the certain value for a shorter period of time since the time point when the inspection current has been supplied, in other words, the monitoring current having higher responsiveness has a larger current value at the inspection confirmation timing than the monitoring current ((C) in FIG. 25) having lower responsiveness. Therefore, by comparing values of the monitoring current at the inspection confirmation timing, it is possible to discern whether the responsiveness of the monitoring current flowing through the electromagnet 130 is high or low, whether the inductance associated with the level of the responsiveness is high or low, and whether the distance d2 between the attracting surface 130*a* and the surface to be attracted 120*a* associated with the magnitude of the inductance is long or short. More specifically, a threshold value of a current value is set at least between the first monitoring current value I1 and the second monitoring current value I2 such that the magnitude relationship between the distance d2 and the threshold can be discerned, and it is determined whether the distance d2 is larger than the threshold or equal to or smaller than the threshold depending on whether the current value of the monitoring current at the inspection confirmation timing is larger than the threshold value or equal to or smaller than the threshold value. That is, it is determined whether or not the attracting surface 130*a* of the electromagnet 130 and the surface to be attracted 120*a* of the iron piece 120 are in close contact with each other.

Returning to FIG. 24, when it is determined in Step S5 that the electromagnet 140 and the iron piece 120 are in close contact with each other, the flow proceeds to Step S6 to confirm whether or not the lock input is the ON signal. If YES, that is, it is the ON signal, the flow proceeds to Step S7 to drive the electromagnet 140.

Step S8 is a step executed in a case where the switch body 102 of the present embodiment is connected to the other device that can output a safety-related output. More specifically, Step S8 is executed in a case where terminals from which the safety-related output of the other device is output are connected to the first safety input unit 222 and the second safety input unit 224. Since the safety-related output that is output from the other device is input to the first safety input unit 222 and the second safety input unit 224 as described above in the present embodiment, in Step S8, it is determined whether or not the safety-related output that is output from the other device is the ON signal. If YES, the safety-related output is the ON signal, and the display unit 142 is lit in green (S10). If NO in Step S9, the safety-related output is the OFF signal, and the display unit 142 is lit in orange (S11). As described above, the display unit 142 glows in red when the actuator 104 is not normally detected or in green when the switch body 102 sets the safety-related output to the ON signal in the present embodiment. That is, when one safety switch 100 is used, a state of the safety switch 100 can be grasped with the two colors of red and green. On the other hand, when one safety switch 100 and the other device that can output the safety-related output are used in combination, light emission colors of the display unit 142 increase, and an increased light emission color is assigned to a color indicating that the safety-related output from the safety switch 100 is the OFF signal since the safety-related output of the other device is not the ON signal. Accordingly, in a case where one safety switch 100 and the other device that can output the safety-related output are used in combination, it is easy to identify a factor of the safety-related output from the safety switch 100 being the OFF signal.

If NO in Step S6 described above, the flow proceeds to Step S12. The determination in Step S12 is similar to that in Step S8. If YES in Step S12, a safety-related output is set to OFF and the display unit 142 blinks in green in Step S13. If NO in Step S12, the safety-related output is set to OFF, and the display unit 142 blinks in orange (S14). In this manner, the light emission pattern of the display unit 142 is set to blinking when the lock input is OFF, so that a driving state of the electromagnet 130 can be grasped to be distinguished from a state of the safety-related output of the other device.

Although the control of the first MCU 202 has been described above, the output to the display unit 142 is performed after the determination result of the first MCU 202 and the determination result of the second MCU 204 are collated.

Figure 26:
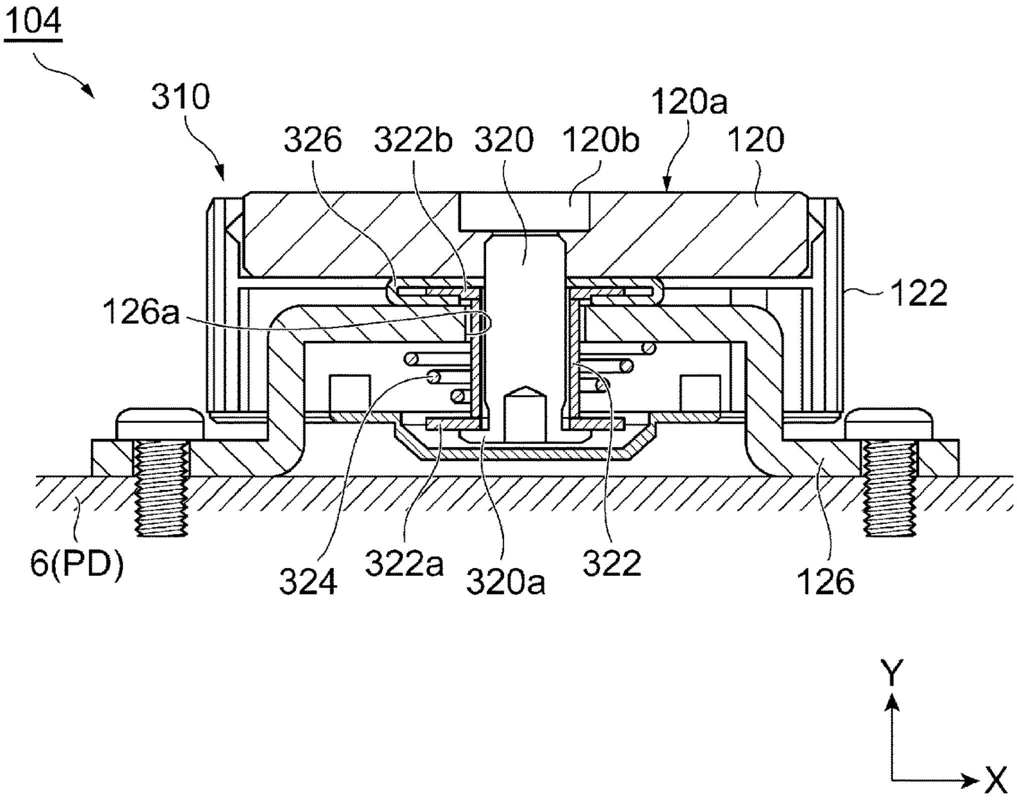
FIG. 26 is a longitudinal cross-sectional view of the actuator of the safety switch of the embodiment.

FIG. 26 is a longitudinal cross-sectional view of the actuator 104, which illustrates a preferred embodiment of the actuator 104. FIG. 26 illustrates the actuator 104 attached to the door PD in which the door frame 6 is attached so as to be parallel to the door opening frame 2 to which the switch body 102 is attached in the mode of FIG. 2. Thus, a normal direction of the door frame 6 (PD) coincides with the Y-axis direction as a normal direction of the attracting surface 130*a* of the electromagnet 139 included in the switch body 102. Furthermore, the actuator 104 in FIG. 26 is in a state in which a normal direction of the surface to be attracted 120*a* of the iron piece 120 included in the actuator 104 coincides with the Y-axis direction. The actuator 104 may have a structure in which the iron piece 120 is fixed to the attachment fitting 126, but the iron piece 120 is movable relative to the attachment fitting 126 in the actuator 104 illustrated in FIG. 26.

Referring to FIG. 26, the attachment fitting 126 described above forms a base member of the actuator 104. The attachment fitting 126 has a U-shaped cross-sectional shape having flanges at both ends, and includes a through hole 126*a* at the center of a planar top portion. The actuator 104 includes a movable pin 320 inserted into the through hole 126*a* of the attachment fitting 126, and one end portion of the movable pin 320 is fixed to the iron piece 120. The iron piece 120 includes a permanent magnet 120*b* having a circular shape in a front view at a center portion of the surface to be attracted 120*a*. The movable pin 320 inserted into the through hole 126*a* of the attachment fitting 126 is movable relative to the attachment fitting 126 in an axial direction of the movable pin 320. With this configuration, a mechanism that moves the surface to be attracted 120*a* with respect to the attachment fitting 126 is configured.

The movable pin 320 includes a pin head 320*a* located at an end on the attachment fitting 126 side. The movable pin 320 is inserted into a sleeve 322. The sleeve 322 has a length in the axial direction of the movable pin 320, and has a first-end flange 322*a* and a second-end flange 322*b* which extend radially outward and circumferentially. The first-end flange 322*a* and the second-end flange 322*b* of the sleeve 322 are used to set a constant position of the iron piece 120 with respect to the movable pin 320, and the iron piece 120, the movable pin 320, and the sleeve 322 move with respect to the attachment fitting 126.

The movable pin 320 and the sleeve 322 are movable in the axial direction of the movable pin 320 as an outer circumferential surface of the sleeve 322 is guided to the through hole 126*a*. The sleeve 322 has a guide function of guiding the movement of the movable pin 320 in the axial direction. The movable pin 320 is also swingable inside the through hole 126*a* together with the sleeve 322. That is, a diameter of the sleeve 322 is smaller than a diameter of the through hole 126*a*, and the sleeve 322 is loosely fitted into the through hole 126*a*. With this configuration, a swing mechanism for swinging the surface to be attracted 120*a* is configured.

A compression coil spring 324 is provided between the first-end flange 322*a* of the sleeve 322 and the attachment fitting 126. The compression coil spring 324 constitutes a biasing unit that biases the movable pin 320 and the surface to be attracted 120*a* in a direction approaching the door frame 6.

Figure 27A:
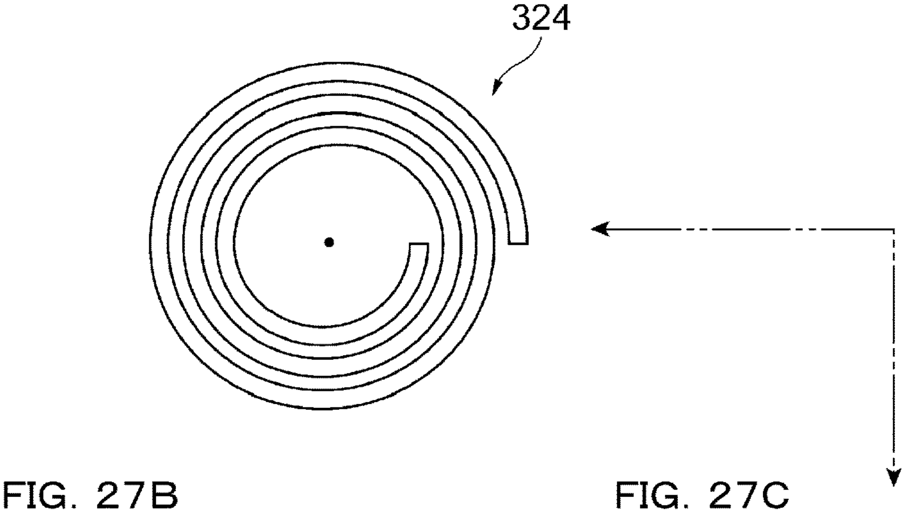
Figure 27B:
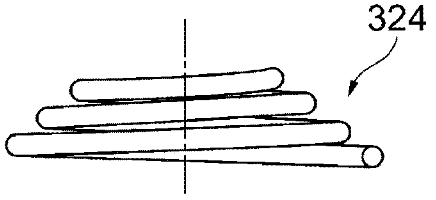
Figure 27C:
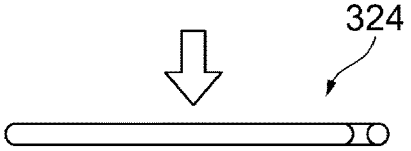

FIG. 27A is a plan view of the compression coil spring 324. FIG. 27B is a side view of the compression coil spring 324 in an unloaded state. FIG. 27C is a side view of the compression coil spring 324 in a state of being compressed as a load is applied. As can be seen from FIG. 27A, the compression coil spring 324 is configured using a spiral spring having a trapezoidal shape in the side view with a diameter gradually reduced in an axial direction. The compression coil spring 324 having a spiral shape can have a flat shape in the side view in the compressed state. Thus, a moving range when the movable pin 320 moves is expanded in a direction in which the compression coil spring 324 is compressed.

In the present embodiment, the state of the actuator 104 illustrated in FIG. 26, that is, a state in which the iron piece 120 has been moved in the direction approaching the door frame 6, in other words, in a direction away from the electromagnet 130 by the compression coil spring 324 is defined as a standby state, and a position of the iron piece 120 in this state is defined as a standby position. The standby position of the iron piece 120 corresponds to a position of the iron piece 120 represented by the two-dot chain line illustrated in FIG. 23. Note that modifications of the compression coil spring 324 can include an elastic body such as a disc spring or rubber.

A cushion member 326 is disposed between the second-end flange 322*b* of the sleeve 322 and the attachment fitting 126 and the iron piece 120 (FIG. 26). As will be described later, an impact when the iron piece 120 overlaps the attracting surface 130*a* of the electromagnet 130 based on an attractive force of the permanent magnet 120*b* is alleviated by the compression coil spring 324 and the cushion material 326.

Figure 28A:
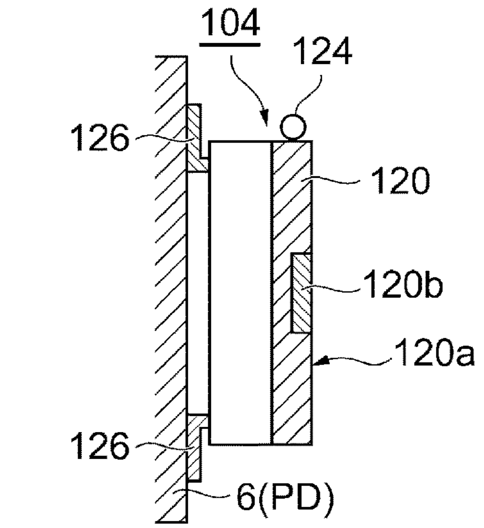
Figure 28B:
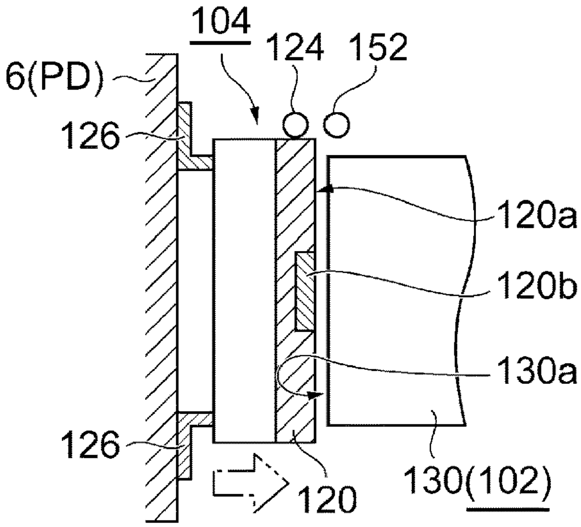
Figure 28C:
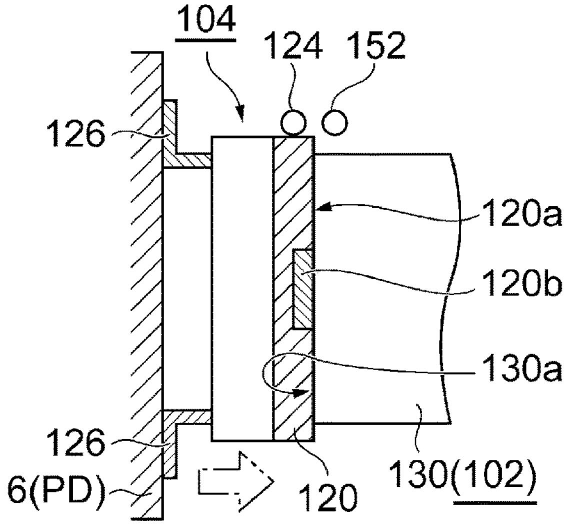

FIGS. 28A-C are views for describing an action of the actuator 104. FIG. 28A illustrates the actuator 104 in the standby state, and corresponds to FIG. 26.

FIG. 28B illustrates a state in which the actuator 104 has approached the attracting surface 130*a* of the electromagnet 130 included in the switch body 102 as the door PD is closed in a process in which the door PD is changed from an open state to the closed state, that is, in a process in which the worker closes the door PD. At this time, the electromagnet 130 is not driven. As illustrated in FIG. 28B, when the actuator 104 approaches the electromagnet 130, the attractive force by the permanent magnet 120*b* included in the actuator 104 acts on the attracting surface 130*a* of the electromagnet 130. When the attractive force becomes larger than a spring force of the compression coil spring 324, the compression coil spring 324 starts to be compressed. Then, under the attractive force of the permanent magnet 120*b*, the movable pin 320 and the iron piece 120 move together with an actuator housing 122 in the direction away from the door frame 6, that is, in the direction approaching the attracting surface 130*a*. Therefore, for example, when the door PD is closed and the distance between the actuator 104 and the switch body 102 falls within a certain range, the movable pin 320 and the iron piece 120 move together with the actuator housing 122 in the direction approaching the attracting surface 130*a* along the Y-axis direction.

FIG. 28C illustrates a state in which the surface to be attracted 120*a* and the attracting surface 130*a* are brought into close contact with each other by the attractive force of the permanent magnet 120*b* through the process of (II) described above. The threshold for the distance d is set such that the distance d estimated based on the intensity of the radio signal received from the actuator communication unit 124 via the sensor-side coil 152 in this state is equal to or smaller than the threshold, that is, such that the actuator communication unit 124 determines that the actuator 104 is within the predetermined range with respect to the switch body 102 in this state. Further, in the state of FIG. 28C, the second MCU 204 supplies a detection current to the electromagnet 130 and monitors a current flowing through the electromagnet 130, thereby determining whether or not the surface to be attracted 120*a* and the attracting surface 130*a* are in close contact with each other. When it is determined that the surface to be attracted 120*a* and the attracting surface 130*a* are in close contact with each other, the second MCU 204 drives the electromagnet 130 to attract the iron piece 120 to maintain the closed state of the door PD. Note that, in the present embodiment, the iron piece 120 moves to the attracting surface 130*a* side by the attractive force of the permanent magnet 320 included in the actuator 104 so that the attracting surface 130*a* and the surface to be attracted 120*a* are brought into close contact with each other in the closed state of the door PD. However, the movement of the iron piece 120 to the attracting surface 130*a* side may be realized by another unit. For example, it may be configured such that the iron piece 120 moves to the attracting surface 130*a* side by inertia when the door PD is set to the closed state, that is, when the door PD is closed. Further, the electromagnet 130 may be configured such that the electromagnet 130 is driven to generate an attracting force weaker than an attracting force for maintaining the closed state of the door PD, and the iron piece 120 moves to the attracting surface 130*a* side by the attractive force.

Figures 29A, 29B, 29C:
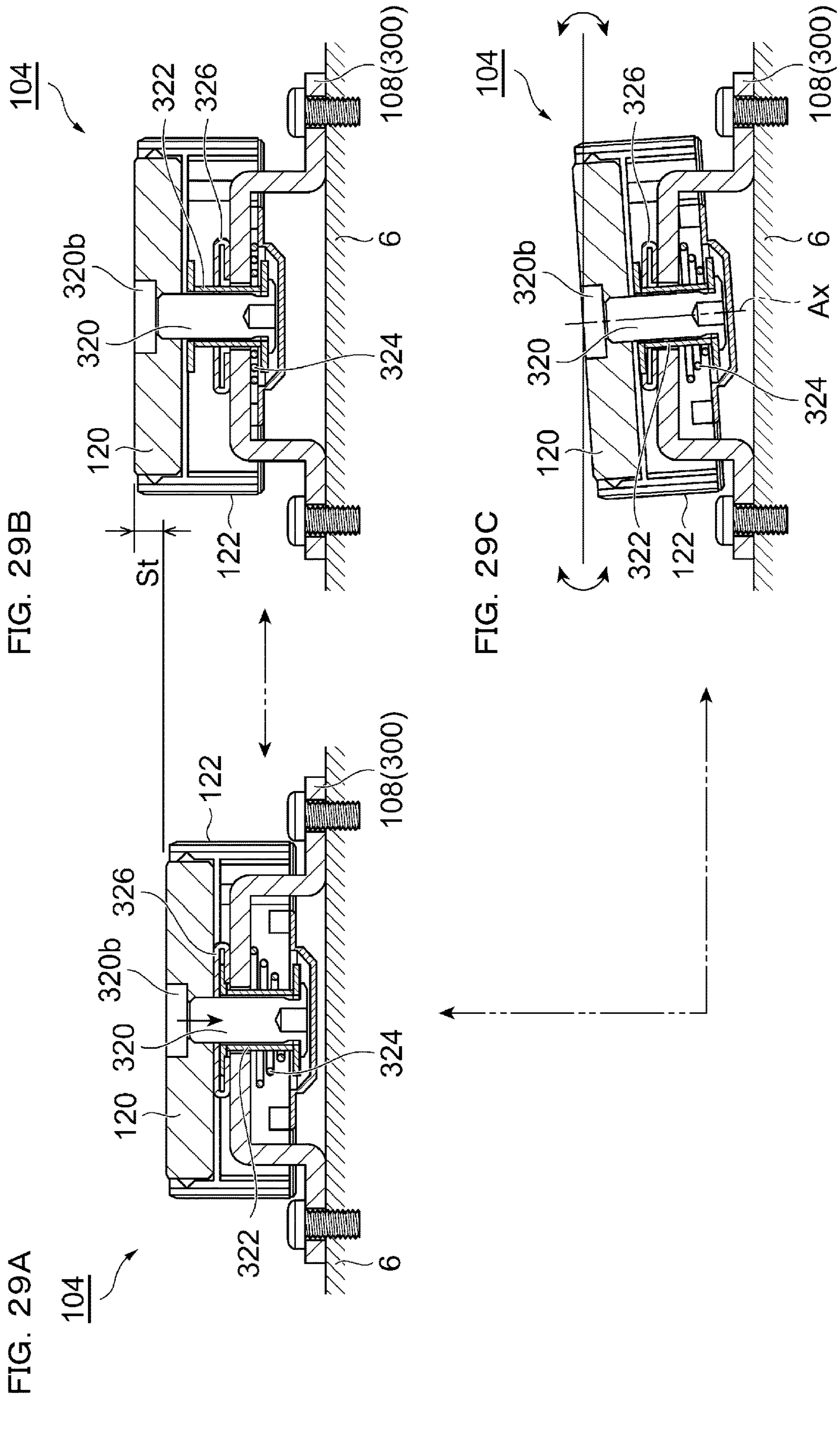

FIGS. 29A-C are cross-sectional views for describing a state change of the actuator 104. FIG. 29A corresponds to FIG. 27A, and the actuator 104 is in the standby state. FIG. 29B illustrates a state in which the iron piece 120 of the actuator 104 has advanced to the maximum to be set at a maximum action position, that is, a state in which the movable pin 320 is set at a maximum stroke position displaced in the axial direction, that is, the Y-axis direction. This state can be created by the attractive force of the permanent magnet 120*b*. FIG. 29C is a view for describing that the iron piece 120 is swingable to obtain a state in which the surface to be attracted 120*a* is parallel to the attracting surface 130*a* when the iron piece 120 and the attracting surface 130*a* overlaps each other under the attractive force of the permanent magnet 320. The parallel state between the surface to be attracted 120*a* and the attracting surface 130*a* is established by swinging, that is, a tilting motion of an axial line Ax of the movable pin 320.

As described above, the actuator communication unit 124 is disposed in the actuator housing 122 surrounding the periphery of the iron piece 120 is disposed with (FIG. 3). On the other hand, the sensor-side coil 152 is disposed in the switch body 102 (FIG. 10). It is determined whether the actuator 104 is within the predetermined range with respect to the switch body 102, that is, whether or not the distance d is equal to or smaller than the threshold based on the intensity of the radio signal received from the actuator communication unit 124 via the sensor-side coil 152.

However, in a case where the switch body 102 is provided in a positional relationship in which the electromagnet 130 and the sensor-side coil 152 are close to each other, there is a possibility that a magnetic flux leaking from the electromagnet 130 to the surroundings affects the intensity of the radio signal received from the actuator communication unit 124 via the sensor-side coil 152. In particular, since the diameter D1 of the surface to be attracted 120*a* is set to be larger than the diameter D2 of the attracting surface 130*a* in the present embodiment, the sensor-side coil 152 and the coil included in the actuator communication unit 124 face each other in a positional relationship in which at least a part of the sensor-side coil 152 provided near the electromagnet 130 overlaps the surface to be attracted 120*a* as viewed in the normal direction of the attracting surface 120*a* in a state in which the attracting surface 130*a* and the surface to be attracted 120*a* are in contact with each other. Thus, the magnetic flux leakage that affects the intensity of the radio signal received via the sensor-side coil 152 is likely to occur. In order to reduce the influence of the magnetic flux leakage on the radio signal, the electromagnet of the present embodiment has a configuration illustrated in FIG. 30. As is well known, the electromagnet 130 includes a core 140*a* and a cylindrical yoke portion Yk surrounding the core. The core 140*a* and the yoke portion Yk may be formed separately, but the core 140*a* and the yoke portion Yk are integrally formed in this embodiment. Further, the protrusion 130*b* described above is formed with a part of the yoke portion Yk in the embodiment. That is, the yoke portion Yk has a shape in which a part in the circumferential direction protrudes radially outward. As a modification, an attachment portion for attachment of the switch body 102 may be provided in the switch body 102 separately from the protrusion 130*b* in which a part of the yoke portion Yk protrudes radially outward.

Figure 30:
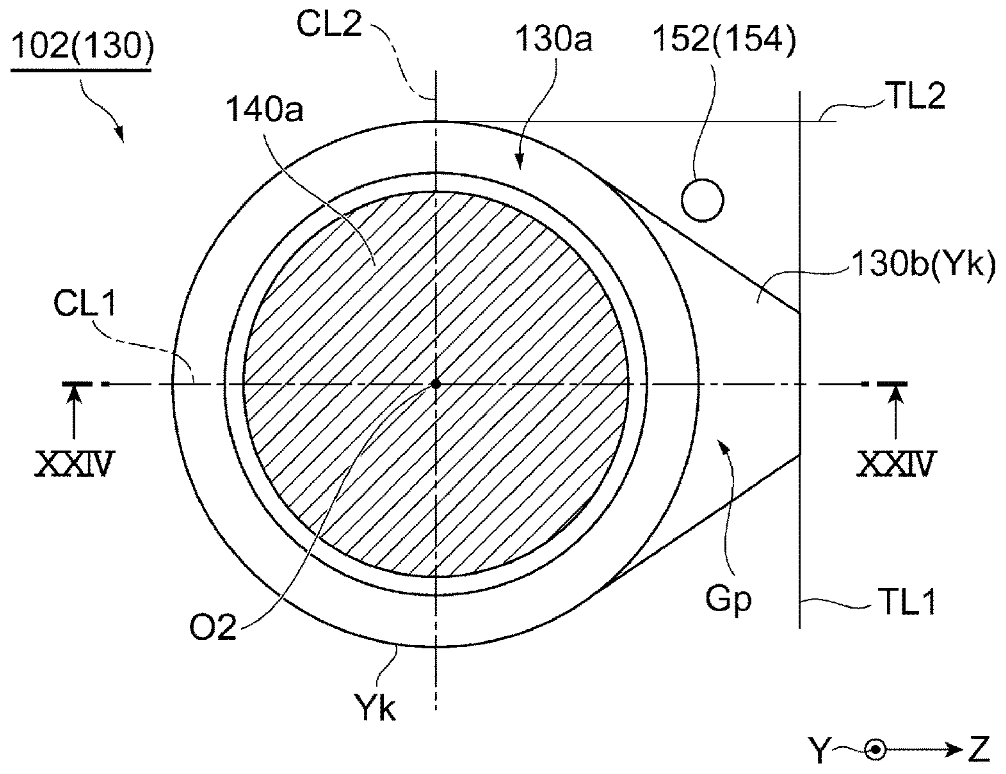
FIG. 30 is a view for describing a technical meaning in which a sensor-side coil is arranged at a site where leakage of a magnetic flux is suppressed by providing a protrusion protruding radially outward on a part of a cylindrical outer surface of a yoke portion in the switch body included in the safety switch of the embodiment, and is a bottom view of the switch body as viewed from a direction of viewing the attracting surface.
Figure 31:
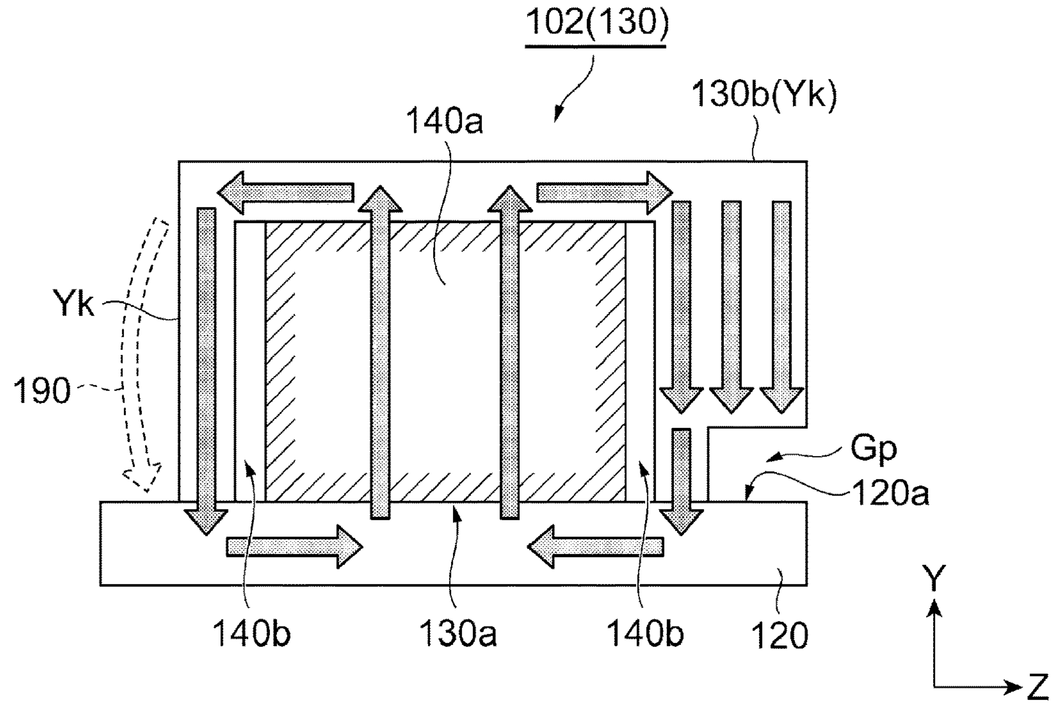
FIG. 31 is a cross-sectional view of a sensor body taken along line XXIV-XXIV in FIG. 30.

The yoke portion Yk has a role of improving the attracting force through the magnetic flux output from the electromagnet 130. FIG. 31 is a cross-sectional view taken along line XXIII-XXIII in FIG. 30. Arrow 190 drawn by the broken line in FIG. 31 indicates a magnetic flux leaking from the electromagnet 130. In FIG. 31, reference sign 140*a* denotes the core. A magnet wire is wound around the core 140*a*. In FIG. 31, a portion between the core 140*a* and the yoke portion Yk located on the outer circumference of the core is drawn as a void 140*b*, but the magnet wire is located in the portion of the void 140*b* as is well known. As the electromagnet 130 attracts the actuator 104, a magnetic circuit is formed by the electromagnet 130 and the actuator 104. A magnetic flux in the magnetic circuit is indicated by the arrow filled in black. The magnetic flux generated from the core 140*a* is generated to be substantially uniform in the circumferential direction of the yoke portion Yk. Further, a magnetic flux passing through the yoke portion Yk is known to leak out of the yoke portion Yk when the density of the passing magnetic flux is high. When the protrusion 130*b* is provided as a part of the yoke portion Yk, a portion of the yoke portion Yk where the protrusion 130*b* is provided in the circumferential direction has a larger cross-sectional area than the other portion in the circumferential direction. Thus, in the yoke portion Yk, the density of the magnetic flux of the portion where the protrusion 130*b* is provided in the circumferential direction is relatively low as compared with that of the other portion, and as a result, the magnetic flux leakage in the vicinity of the protrusion 130*b* is reduced.

The sensor-side coil (antenna coil) 152 is arranged in the vicinity of the protrusion 130*b*. A preferable arrangement of the sensor-side coil 152 will be described in detail. Referring to FIG. 30, if the periphery of the attracting surface 130*a* is divided into four regions by a first center line CL1 passing through a center O2 of the attracting surface 130*a* and passing through a center line of the protrusion 130*b* and a second center line CL2 passing through the center O2 and orthogonal to the first center line CL1, the sensor-side coil 152 is arranged in the first quadrant on one side of the protrusion 130*b* in the illustrated example. Of course, the sensor-side coil 152 may be arranged in the second quadrant on the other side of the protrusion 130*b*. Moreover, the sensor-side coil 152 is arranged so as to be located closer to the attracting surface 130*a* than a first tangent line TL1 orthogonal to the first center line CL1 and in contact with the top surface of the protrusion 130*b*, and so as to be located closer to the attracting surface 130*a* than a second tangent line TL2 orthogonal to the second center line CL2 and in contact with the outer circumference of the attracting surface 130*a*.

Figure 32:
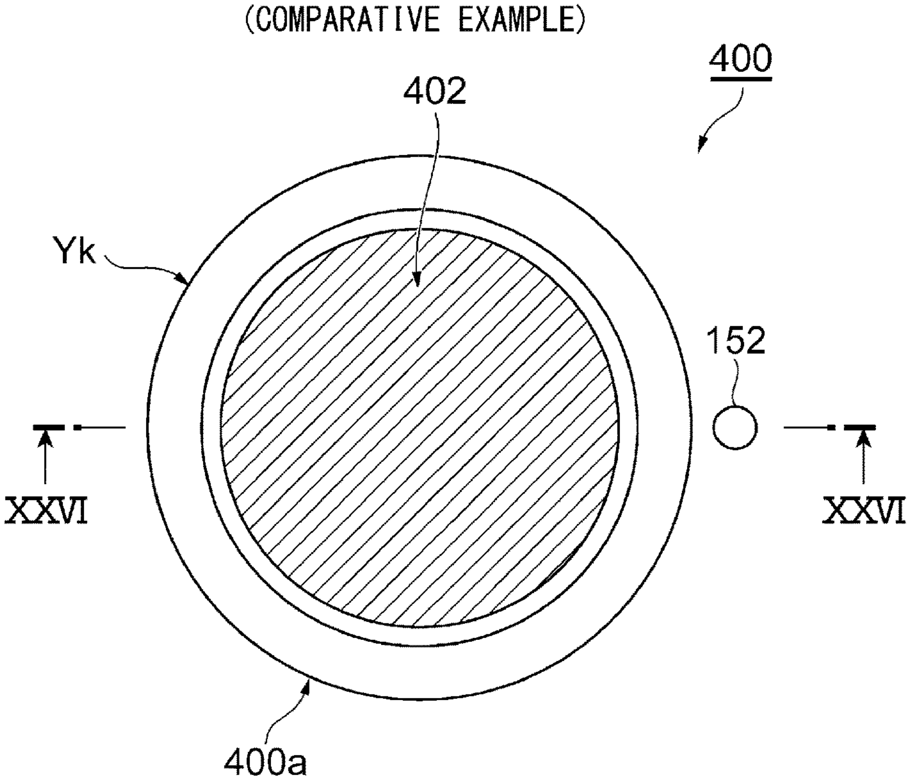
FIG. 32 is a view for describing that a sensor-side coil is adversely affected by a magnetic flux leaking from a cylindrical switch body having a circular attracting surface in a switch body of a comparative example, and is a bottom view of the switch body of the comparative example as viewed from a direction of viewing the attracting surface.
Figure 33:
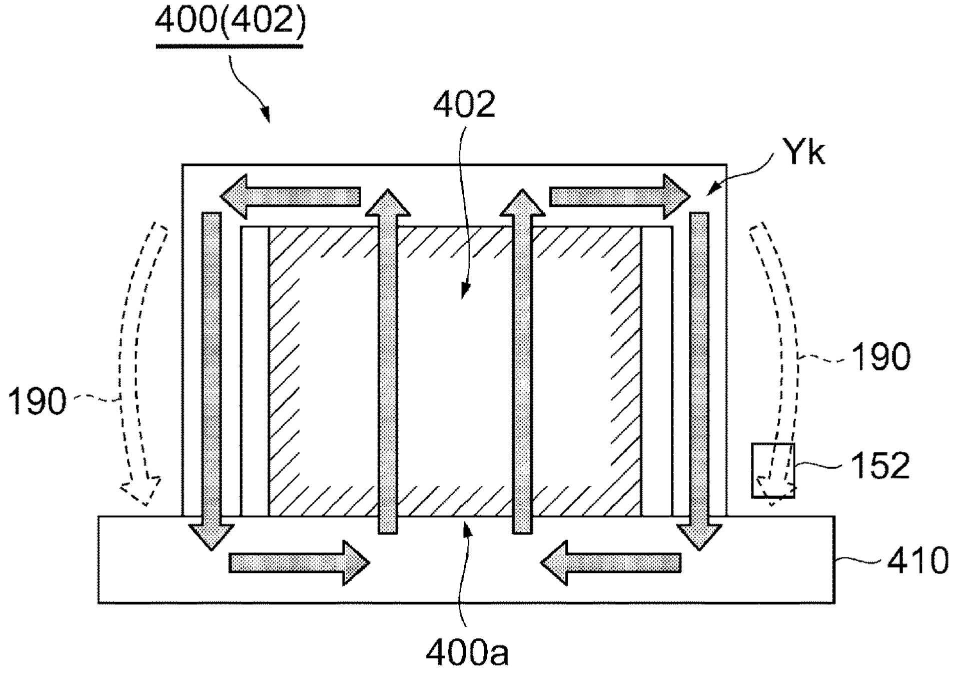
FIG. 33 is a cross-sectional view of the sensor body of the comparative example taken along line XXVI-XXVI in FIG. 32.

In order to describe an advantage of arranging the sensor-side coil (antenna coil) 152 in the vicinity of the protrusion 130*b*, an electromagnet 400 of a comparative example illustrated in FIGS. 32 and 33 will be described. FIG. 32 is a view of the electromagnet 400 of the comparative example as viewed from an attracting surface 400*a* side. A yoke portion Yk has the same thickness in the circumferential direction. FIG. 33 is a cross-sectional view taken along line XXV-XXV in FIG. 32. In the drawing, reference sign 402 denotes a core. Referring to FIG. 33, the electromagnet 400 of the comparative example attracts the actuator 410 to form a magnetic circuit with the actuator 410. A magnetic flux in the magnetic circuit is indicated by the arrow filled in black. In the magnetic circuit having this configuration, magnetic flux leakage occurs in the periphery of the yoke portion Yk. The magnetic flux leakage is illustrated by arrow 190 drawn by the broken line.

In a case where a sensor-side coil (antenna coil) 152 is arranged in the vicinity of the electromagnet 400 on the outer circumference of the electromagnet 400 of the comparative example, the sensor-side coil (antenna coil) 152 is affected by the magnetic flux 190 leaking from the yoke portion Yk (FIG. 33), and the leaking magnetic flux 190 affects the signal intensity detected by the sensor-side coil (antenna coil) 152.

Returning to FIGS. 30 and 31 related to the present embodiment, the protrusion 130*b* forming a part of the yoke portion Yk is relatively thick, and as a result, the magnetic flux leakage is less likely to occur in the vicinity of the protrusion 130*b*. When the sensor-side coil (antenna coil) 152 is arranged in the vicinity of the protrusion 130*b* where the magnetic flux hardly leaks in this manner (FIG. 30), the influence of the magnetic flux leakage on the signal intensity detected by the sensor-side coil (antenna coil) 152 can be reduced.

As described above, the protrusion 130*b* has an action of reducing the magnetic flux density in the portion where the protrusion 130*b* is provided. In general, an attracting force of a magnet varies depending on the magnetic flux density of a surface in contact with an attraction target. Thus, the electromagnet 130 is shaped such that a gap Gp (FIG. 31) is formed between the iron piece 120 and the protrusion 130*b* when the electromagnet 130 has attracted the iron piece 120. The gap Gp can make an area in contact with the iron piece 120 smaller than the cross-sectional area of the portion where the protrusion 130*b* is located in the Y-axis direction in a portion where the protrusion 130*b* is provided in the yoke portion Yk. Accordingly, it is possible to suppress a decrease in the magnetic flux density in the portion in contact with the iron piece 120 by providing the protrusion 130*b*, whereby it is possible to maintain the attracting force of the electromagnet 130. That is, the attraction can be effectively stabilized by the gap Gp. The gap Gp can be formed by designing a protrusion (the protrusion 130*b*) having a relatively large thickness so as to be positioned at a position retracted from the attracting surface 130*a* in the Y-axis direction (FIG. 31). Further, the yoke portion Yk basically has the same thickness in the circumferential direction by forming the gap Gp in the electromagnet 130 of the present embodiment, and thus, the magnetic flux density in the circumferential direction at a site where the yoke portion Yk is in contact with the iron piece 120 is configured to be the same. As a result, the attraction of the actuator 104 by the electromagnet 130 can be further stabilized.

Figure 34:
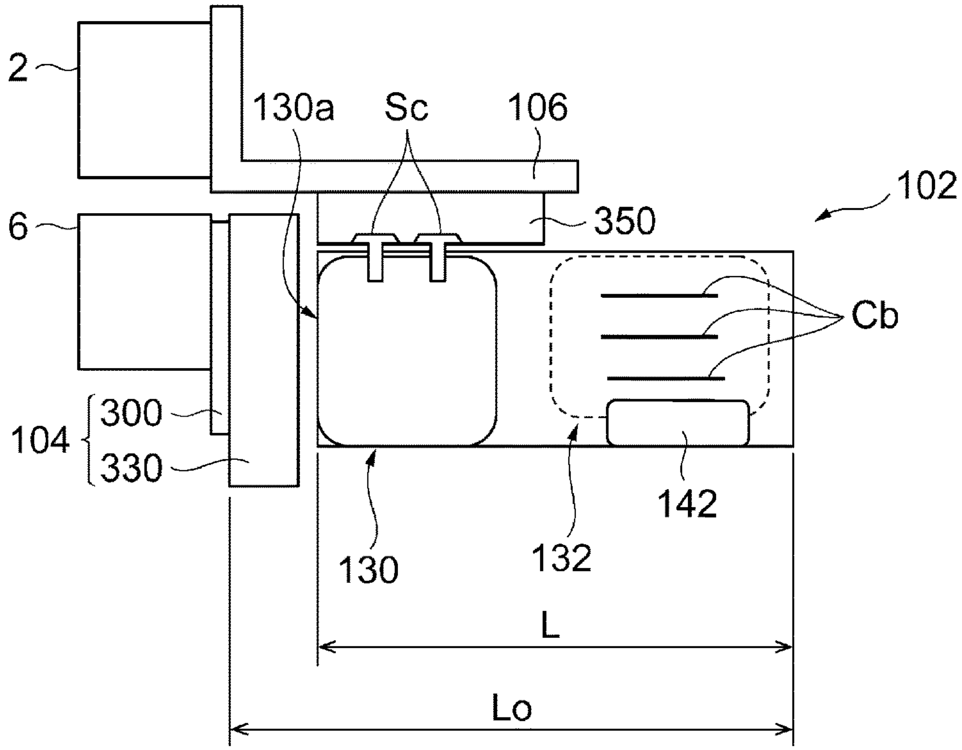
FIG. 34 is a view schematically illustrating an installation structure of the switch body installed in the door opening frame.
Figure 35:
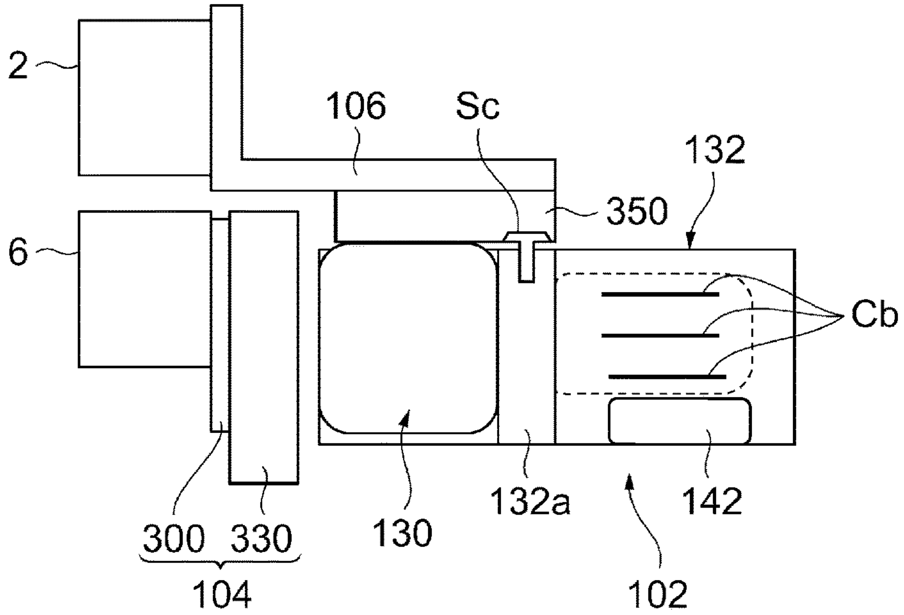
FIG. 35 is a schematic view corresponding to FIG. 34 for describing a first modification of the installation structure of the switch body.
Figure 36:
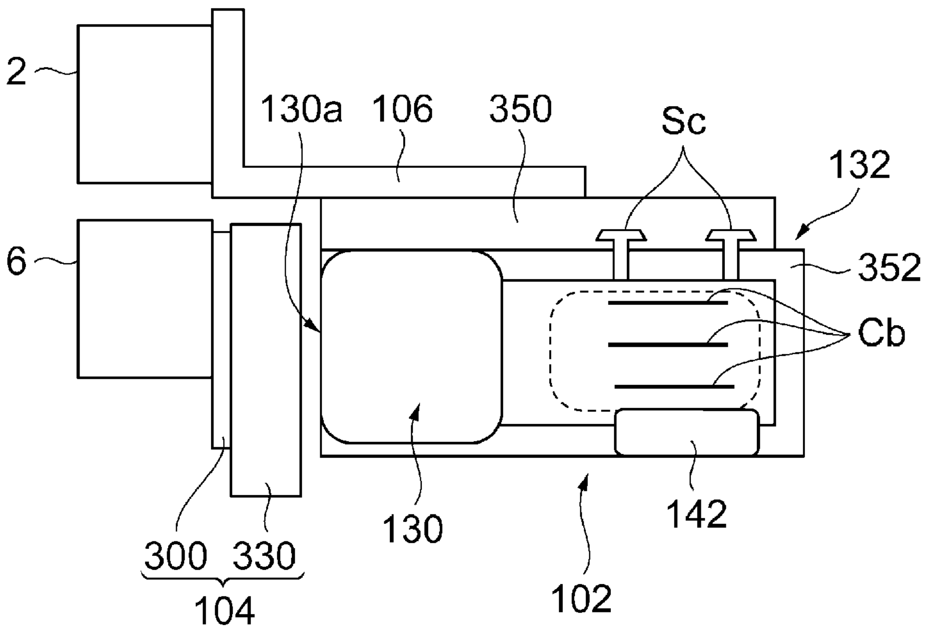
FIG. 36 is a schematic view corresponding to FIG. 34 for describing a second modification of the installation structure of the switch body.

FIGS. 34 to 36 are views for describing an example in which the switch body 102 is attached to the door opening frame 2. In the drawings, reference sign 350 denotes a level adjustment member configured to adjust a height level of the switch body 102. FIG. 34 illustrates an example in which the switch body 102 is fixed to the level adjustment member 350, and the switch body 102 is fixed to the first bracket 106 via the level adjustment member 350. FIG. 35 is a modification of FIG. 34, and an intermediate metal plate 132*a* connected to the electromagnet 130 is interposed between the electromagnet 130 and the board accommodating portion 132, and the switch body 102 is screwed to the intermediate metal plate 132*a*. When the attachment portion for fixing the switch body 102 to the first bracket 106 is provided in front of the housing Hg forming the board accommodating portion 132 in this manner, the housing Hg is hardly affected by an impact caused by the actuator 104 abutting on the electromagnet 130. Thus, even if the housing Hg is made of a relatively inexpensive resin, the housing Hg can be formed into a shape that is long in the front-rear direction as illustrated in FIG. 35. Further, FIG. 36 is a modification of FIG. 34 and illustrates an example in which at least an upper portion of the board accommodating portion 132 is formed with a metal housing 352, the switch body 102 is screwed to the metal housing 352 of the board accommodating portion 132, and then, the switch body 102 is fixed to the first bracket 106 via the level adjustment member 350. The metal housing 352 is connected to the electromagnet 130. In this modification, the durability of the switch body 102 is improved by providing the metal housing 352, which has an attachment portion and forms the board accommodating portion 132, against the impact caused by the actuator 104 abutting on the electromagnet. In the first modification illustrated in FIG. 35 and the second modification illustrated in FIG. 36, the board Cb may adopt a floating support structure, but filling with resin may be performed.

When describing the safety switch 100 with reference to FIG. 34 which is a schematic view, a length dimension L of the switch body 102 in the Y-axis direction is larger than the diameter of the attracting surface 130*a*. In an electromagnet to which a certain current is applied, the strength of an attracting force by the electromagnet is proportional to the number of windings of a coil. Therefore, the electromagnet 130 of the present embodiment has a certain length in the front-rear direction in order to achieve a certain attracting force without increasing the diameter dimension of the attracting surface 130*a*. In a case where there is a limit on the length of the entire switch body 102 in the front-rear direction, that is, the Y-axis direction, it is more difficult to form an accommodating portion at the rear of the electromagnet 130 as a dimension of the electromagnet 130 in the front-rear direction increases. According to the configuration in which the length L of the switch body 102 in the Y-axis direction is larger than the diameter of the attracting surface 130*a*, the housing Hg in which the accommodating portion is formed can be arranged at the rear of the electromagnet 130, and thus, an area occupied by the switch body 102 in the opening can be reduced. Furthermore, a total length LO of the switch body 102 and the actuator 104 is designed to be larger than the diameter of the attracting surface 130*a* in the Y-axis direction in the present embodiment.

What is claimed is:

1. A safety switch in which an actuator is installed to be relatively movable with respect to a switch body, the actuator having a member to be magnetized on which a surface to be attracted is formed, the safety switch comprising:

a detection unit that detects that the actuator is within a predetermined range with respect to the switch body;

an electromagnet in which an attracting surface corresponding to the surface to be attracted of the actuator is formed on a front surface side;

a lock input unit that receives a lock signal for locking the relative movement of the actuator;

a drive control unit that drives the electromagnet in such a manner that the attracting surface and the surface to be attracted are attracted to each other based on the lock signal received by the lock input unit;

a safety control unit that generates a safety signal based on the detection result of the detection unit;

a housing forming an accommodating portion, which accommodates the drive control unit and the safety control unit, on a back surface side of the electromagnet;

a display control unit that generates state information based on a detection result obtained by the detection unit; and a display unit that is arranged on a side closer to the back surface side than the electromagnet and displays the state information generated by the display control unit.

2. The safety switch according to claim 1, further comprising one or a plurality of control boards on which the drive control unit and the safety control unit are mounted.

3. The safety switch according to claim 1, wherein the electromagnet is connected to the housing on the back surface side.

4. The safety switch according to claim 1, wherein the attracting surface of the electromagnet is smaller than the surface to be attracted of the actuator, the detection unit includes an antenna coil that transmits and receives a radio signal to and from an actuator coil provided in the actuator, and the antenna coil is provided at a position facing the actuator coil in a first state in which the attracting surface of the electromagnet faces the surface to be attracted of the actuator in contact with the attracting surface and the attracting surface and the surface to be attracted come in contact with each other.

5. The safety switch according to claim 4, wherein the electromagnet is provided with a protrusion configured to reduce an influence on the antenna coil caused by driving of the electromagnet near a position where the antenna coil is provided.

6. The safety switch according to claim 5, wherein in the first state, the protrusion and the surface to be attracted face each other with a gap interposed between the protrusion and the surface to be attracted.

7. The safety switch according to claim 1, wherein the drive control unit drives the electromagnet in such a manner that the attracting surface and the surface to be attracted are attracted to each other based on a detection result obtained by the detection unit and the lock signal received by the lock input unit.

8. The safety switch according to claim 1, wherein the electromagnet has an attachment portion configured to attach the switch body to an installation location.

9. The safety switch according to claim 1, further comprising a metal member connected to the electromagnet, wherein the metal member has an attachment portion configured to attach the switch body to an installation location.

10. The safety switch according to claim 1, wherein the display unit is arranged at a position away from the attracting surface in a direction of a normal of the attracting surface.

11. The safety switch according to claim 1, further comprising a housing connected to the electromagnet on a back surface of the electromagnet, wherein the attracting surface of the electromagnet and at least a part of a side surface of the electromagnet are exposed, and the electromagnet and the housing form at least one outer shape of a substantially cylindrical outer shape or a substantially prismatic outer shape.

12. The safety switch according to claim 1, wherein the display control unit generates the state information based on the detection result and a driving state of the electromagnet.

13. The safety switch according to claim 1, further comprising an attachment portion configured to fix the switch body to an installation location, wherein at least a part of the display unit is provided on an opposite side of the attachment portion on a circumference having a direction of a normal of the attracting surface as an axis.

14. The safety switch according to claim 1, further comprising a connector coupling portion provided on a back surface of the switch body.

15. The safety switch according to claim 1, wherein the display unit is inclined forward.

16. A safety switch in which an actuator is installed to be relatively movable with respect to a switch body, the actuator having a member to be magnetized on which a surface to be attracted is formed, the safety switch comprising:

a detection unit that detects that the actuator is within a predetermined range with respect to the switch body;

an electromagnet in which an attracting surface corresponding to the surface to be attracted of the actuator is formed on a front surface side;

a lock input unit that receives a lock signal for locking the relative movement of the actuator;

a drive control unit that drives the electromagnet in such a manner that the attracting surface and the surface to be attracted are attracted to each other based on the lock signal received by the lock input unit;

a safety control unit that generates a safety signal based on the detection result of the detection unit; and a housing that is connected to the electromagnet via a connection portion provided on a back surface of the electromagnet and forms an accommodating portion which accommodates the drive control unit and the safety control unit, wherein the attracting surface forms a front surface of the switch body, and a total length of the member and the safety switch in a direction orthogonal to the attracting surface is larger than a diameter of the attracting surface in a first state in which the attracting surface faces the member of the actuator in contact with the attracting surface and the attracting surface and the surface to be attracted of the member come into contact with each other.

17. A safety switch comprising: a switch body arranged in a compartment fixed portion of a compartment system that comparts an operation region in which an apparatus operates; and an actuator installed in a movable portion movable relative to the compartment fixed portion, wherein the switch body includes:

a detection unit that detects that the actuator is within a predetermined range with respect to the switch body;

an electromagnet having an attracting surface that is attracted to a member to be magnetized provided in the actuator; and a display unit that indicates a detection result obtained by the detection unit and is provided at a position hidden by the actuator as viewed in a normal direction of the attracting surface, and the display unit is arranged at a position separated from the attracting surface by half of a total length of the switch body or more in the normal direction of the attracting surface.

* * * * *